(12) United States Patent
Cheng et al.

(10) Patent No.: US 11,854,196 B2
(45) Date of Patent: Dec. 26, 2023

(54) SYSTEM AND METHOD FOR REAL TIME ASSAY MONITORING

(71) Applicant: Ventana Medical Systems, Inc., Tucson, AZ (US)

(72) Inventors: Yu-Heng Cheng, Northville, MI (US); Setareh Duquette, Oro Valley, AZ (US); Lisa A. Jones, Tucson, AZ (US); Chih-Ching Lin, Ann Arbor, MI (US); Javier Andres Perez-Sepulveda, Oro Valley, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 0 days.

(21) Appl. No.: 17/504,414

(22) Filed: Oct. 18, 2021

(65) Prior Publication Data

US 2022/0090995 A1     Mar. 24, 2022

Related U.S. Application Data

(63) Continuation of application No. 16/021,410, filed on Jun. 28, 2018, now Pat. No. 11,320,348, which is a
(Continued)

(51) Int. Cl.
*G06V 10/25*     (2022.01)
*G06T 7/00*     (2017.01)
(Continued)

(52) U.S. Cl.
CPC .......... *G06T 7/0012* (2013.01); *G01N 1/312* (2013.01); *G01N 21/78* (2013.01); *G06T 7/11* (2017.01);
(Continued)

(58) Field of Classification Search
CPC .......... G01N 1/312; G01N 21/78; G01N 1/30; G06T 7/0012; G06T 7/11;
(Continued)

(56) References Cited

U.S. PATENT DOCUMENTS 8,883,509 B2   11/2014   Lemme et al.
2002/0155587 A1*   10/2002   Opalsky ................. G16B 20/00
                                                                        702/19
(Continued)

FOREIGN PATENT DOCUMENTS

JP     11-506196     6/1999
JP     2002-544531     12/2002
(Continued)

OTHER PUBLICATIONS

International Search Report and Written Opinion dated Mar. 30, 2017 in corresponding PCT/EP2016/082377 filed Dec. 22, 2016, pp. 1-20.
(Continued)

*Primary Examiner* — Stephen P Coleman
(74) *Attorney, Agent, or Firm* — Charney IP Law LLC; Thomas M. Finetti

(57) ABSTRACT

A real time assay monitoring system and method can be used to monitor reagent volume in assays for fluid replenishment control, monitor assays in real-time to obtain quality control information, monitor assays in real-time during development to detect saturation levels that can be used to shorten assay time, and provide assay results before the assay is complete, enabling reflex testing to begin automatically. The monitoring system can include a real time imaging system with a camera and lights to capture images of the assay. The captured images can then be used to monitor and control the
(Continued)

quality of the staining process in an assay, provide early assay results, and/or to measure the on-site reagent volume within the assay.

20 Claims, 20 Drawing Sheets

Related U.S. Application Data continuation of application No. PCT/EP2016/082377, filed on Dec. 22, 2016.

(60) Provisional application No. 62/430,826, filed on Dec. 6, 2016, provisional application No. 62/273,232, filed on Dec. 30, 2015.

(51) Int. Cl.
*G01N 21/78* (2006.01)
*G06V 10/56* (2022.01)
*G06V 10/147* (2022.01)
*G06V 20/69* (2022.01)
*G06T 7/11* (2017.01)
*G01N 1/31* (2006.01)
*G01N 1/30* (2006.01)

(52) U.S. Cl.
CPC ............ *G06V 10/147* (2022.01); *G06V 10/25* (2022.01); *G06V 10/56* (2022.01); *G06V 20/695* (2022.01); *G01N 1/30* (2013.01); *G06T 2207/10024* (2013.01); *G06T 2207/30024* (2013.01); *G06T 2207/30072* (2013.01); *G06V 2201/03* (2022.01)

(58) Field of Classification Search
CPC . G06T 2207/10024; G06T 2207/30024; G06T 2207/30072; G06V 10/147; G06V 10/25; G06V 10/56; G06V 20/695; G06V 2201/03
USPC ....................................................... 382/133
See application file for complete search history.

(56) References Cited

U.S. PATENT DOCUMENTS

| | | | |
|---|---|---|---|
| 2003/0013969 A1* | 1/2003 | Erikson | A61B 8/4483 |
| | | | 600/459 |
| 2003/0223107 A1* | 12/2003 | Olszak | G02B 21/082 |
| | | | 359/368 |
| 2004/0033163 A1* | 2/2004 | Tseung | B65D 1/0223 |
| | | | 422/63 |
| 2005/0136549 A1 | 6/2005 | Gholap et al. | |
| 2005/0282292 A1 | 12/2005 | Torre-Bueno | |
| 2006/0239533 A1* | 10/2006 | Tafas | G06V 20/69 |
| | | | 382/128 |
| 2010/0144055 A1* | 6/2010 | Holzman | G01N 33/564 |
| | | | 436/501 |
| 2011/0019013 A1* | 1/2011 | Lin | H04N 5/23248 |
| | | | 348/208.4 |
| 2011/0223632 A1 | 9/2011 | Yamada et al. | |
| 2012/0027282 A1* | 2/2012 | Yoshikawa | A61B 8/13 |
| | | | 382/131 |
| 2012/0135458 A1 | 5/2012 | Corwin et al. | |
| 2013/0301898 A1 | 11/2013 | Jain et al. | |
| 2013/0302852 A1 | 11/2013 | Barnes et al. | |
| 2014/0073003 A1 | 3/2014 | Berberich | |
| 2015/0272422 A1* | 10/2015 | Aoyama | A61B 1/00006 |
| | | | 348/68 |
| 2015/0323776 A1 | 11/2015 | Dyson-Holland et al. | |

FOREIGN PATENT DOCUMENTS

| | | |
|---|---|---|
| JP | WO2003096002 A1 | 9/2005 |
| JP | 2008-516203 | 5/2008 |
| JP | 2011-185895 A | 9/2011 |
| JP | 2014-55950 | 3/2014 |
| JP | 2015-172558 | 10/2015 |
| WO | 9638807 A1 | 12/1996 |
| WO | 00/70541 A1 | 11/2000 |
| WO | 2003095674 A2 | 11/2003 |
| WO | 2003096002 A1 | 11/2003 |
| WO | 2006/037332 A1 | 4/2006 |

OTHER PUBLICATIONS

Schipper, N.W. et al., Quantification of Epithelial Volume by Image Processing Applied to Ovarian Tumors, Cytometry, 1987, pp. 345-352, 8.

\* cited by examiner

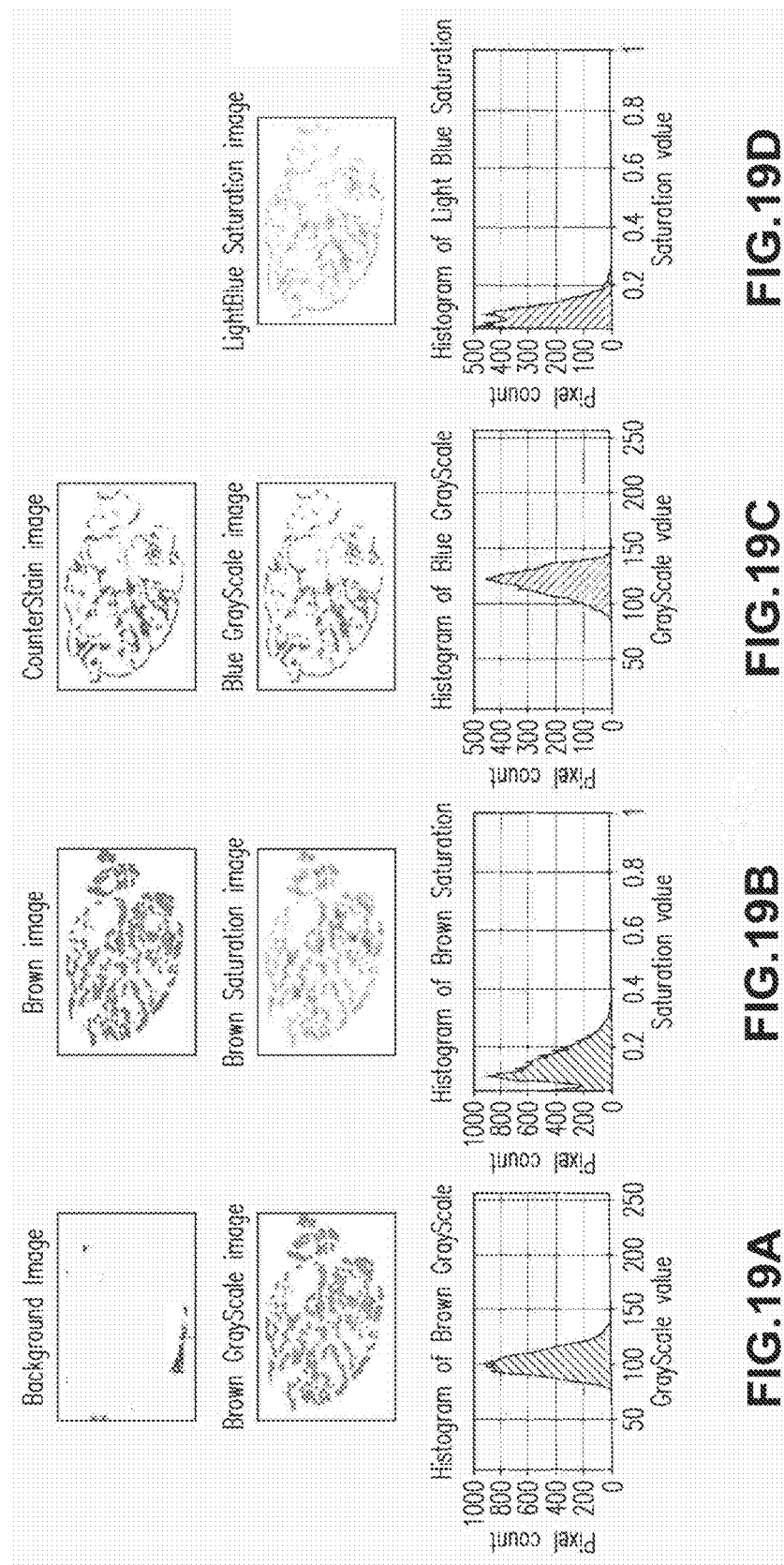

SYSTEM AND METHOD FOR REAL TIME ASSAY MONITORING

RELATED APPLICATIONS

This is a continuation of U.S. patent Ser. No. 16/021,410 filed on Jun. 28, 2018, which application is a continuation of International Patent Application No. PCT/EP2016/082377, filed Dec. 22, 2016, which claims priority to and the benefit of U.S. Provisional Application No. 62/430,826, filed Dec. 6, 2016, and further claims priority to and the benefit of U.S. Provisional Application No. 62/273,232, filed Dec. 30, 2015. These prior patent applications are incorporated by reference herein.

FIELD OF THE DISCLOSURE

The present disclosure generally relates to systems and methods for real time assay monitoring. More particularly, the present disclosure relates to systems and method for utilizing real time assay monitoring for quality control, repeat testing and reflex testing before sample preparation is completed.

BACKGROUND

An assay is an analytical procedure that can be performed to measure one or more properties associated with a biological specimen, for example, and array of molecules, a tissue section or a preparation of cells. In some assays, specimens may be processed for analysis by applying one or more fluids to the specimens. For example, microscope slides bearing biological specimens may be treated with one or more dyes or reagents to add color and contrast to otherwise transparent or invisible cells or cell components. Immunohistochemical (IHC) and in situ hybridization (ISH) assay staining procedures can be used to process tissue specimens and provide information regarding the presence, location and/or amount of particular molecules in a sample.

Assay and platform development as well as commercial assay testing can be costly in terms of time and resources, particularly when tests fail and must be repeated. Currently, tissue staining quality of a specimen undergoing an assay is evaluated by a pathologist only after the assay is completed, and the pathologist does not have any access to the slide before the specimen leaves the assay processing platform. This process can take up to 13 hours for ISH assays. During assay and platform development, the same experimental conditions can be repeatedly performed to produce results, which then are evaluated by a pathologist, again, only after the assay is completed, to ensure consistent outcomes for the assays. Information about where and when any failures in the staining process occurred is unknown to the pathologist, and platform developers are left to run entire batteries of assays to find the root cause of failures that need to be fixed.

Laboratories could use a solution that addresses the limited availability of stain quality control information during sample processing so that should problems arise, a new test could be started or a precious sample could be rescued by performing some remedial procedure. Additionally, it would be advantageous if assays could be monitored such that they are not run longer than needed, or even better, if preliminary results could be made available prior to assay completion. Preliminary results not only could allow laboratories to improve efficiency by running tests only as long as needed, but could also permit a laboratory (or healthcare provider) to order/start additional tests indicated by such preliminary tests results. Patients that depend on complete test results for diagnoses of their conditions are also appreciative of a faster time to first result, and thankful to avoid the need to provide an additional sample for testing, assuming that is even possible.

SUMMARY

The present disclosure is directed to digital pathology tools that provide electronic results of assay outcomes and stain quality, which in some embodiments is provided early in the assay such that problems can be addressed and/or new samples can be started much sooner than if the sample requires a read by a pathologist to determine test quality. In one embodiment, a digital pathology tool can include a real time monitoring system with automated scoring that can score the slides from an assay. In a particular embodiment, the real time monitoring system can provide a "saturation index," which is a score that correlates to a signal intensity score. By providing the saturation index in real time, the real time monitoring system can be used to evaluate assay quality in real time while the assay is occurring. The generation of the saturation index can be automated in the real time monitoring system and used for various assay monitoring applications, such as the monitoring of assays with various protocols, while the assays are occurring. In addition, the results of assay outcome can be obtained in real time, before the assay is complete, the slide is "coverslipped," and then examined by a pathologist.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

FIG. 18A shows images visually illustrating the process of tissue identification as described with regard to the process of FIG. 17.

FIGS. 19A-19D show a comparison of several schemes of color space conversion followed by conversion to grayscale.

FIG. 19A illustrates a brown grayscale image and the resulting histogram derived from the image.

FIG. 19B illustrates a brown saturation image and the resulting histogram derived from the image.

FIG. 19C illustrates a blue grayscale image and the resulting histogram derived from the image.

FIG. 19D illustrates a light blue saturation image and the resulting histogram derived from the image.

FIG. 23A illustrates that a real-time assay monitoring system can be used, for example, to calculate a percentage of positive cells of in the CD20, where in the CD20 assay, three colors are evident in the images: brown for the DAB signal, light blue for the counterstaining signal and a white background.

FIG. 23B illustrates that the process of k-means clustering in HSV color space can be used to separate brown from other colors. FIG. 23B further illustrates that an index based on pixels instead of cells may be calculated, wherein the percentage positive cells is calculated by dividing the number of brown pixels by the sum of brown and blue pixels and multiplying by 100.

FIG. 24A illustrates an image stained by DAB (brown) and a Red chromogen. The original image may be separated into red, blue (counterstain), and red channels, as well as a residual channel.

FIG. 24B illustrates that the process of k-means clustering in RGHB color space may be an optimal solution for color detection in a DAB/Red assay.

Wherever possible, the same reference numbers are used throughout the drawings to refer to the same or like parts.

DETAILED DESCRIPTION

Figure 1:
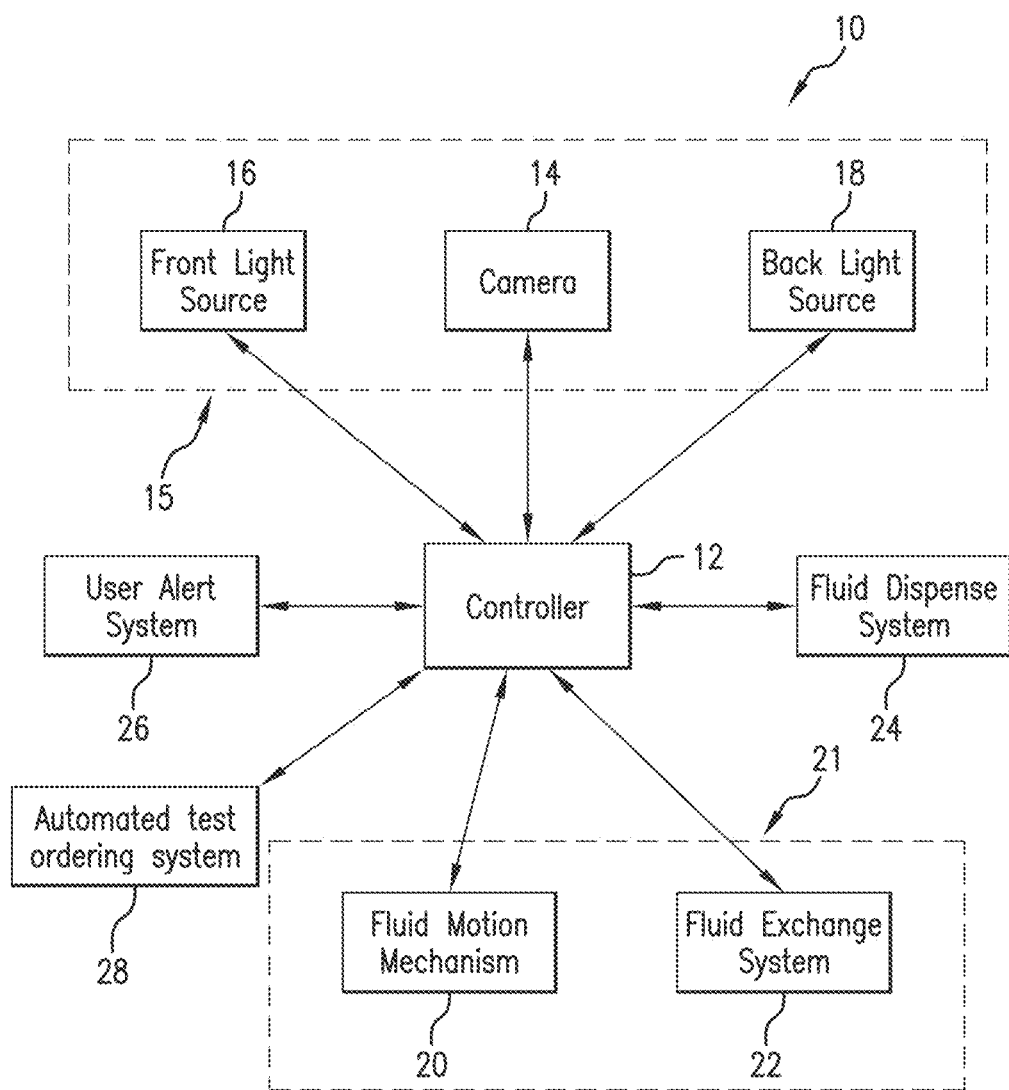
FIG. 1 schematically shows an embodiment of a real time assay monitoring system.

The present application generally pertains to a real time assay monitoring system (RTAMS) that can monitor fluid volume in assays for volume adjustment control, monitor stain process quality in real-time, and/or output test results in real-time. In one embodiment, the disclosed system includes a real time imaging system to obtain images of a sample undergoing a processing step (such as staining, de-staining, bluing or differentiation) to calculate a saturation index that correlates to a signal intensity score. The RTAMS can use the calculated saturation index to monitor the signal intensity of assays in real time and predict assay outcomes before they are complete. The imaging system in the RTAMS can be used to measure the on-site fluid volume with the specimen to control the system to overcome any fluid evaporation issues that may occur in an assay process. The imaging system in the RTAMS can also be applied, for example, to monitor an assay by tracking changes in tissue color(s) and other image based characteristics to predict assay outcomes or results. With the capability to monitor an assay while the assay is ongoing, the RTAMS can be a developmental tool to develop new reagents, assays, or platforms. Tissue, slide and stain quality can also be tracked in real time for quality assurance, and users alerted early in the process such that remedial measures can be taken. Furthermore, the RTAMS can function as a diagnostic tool, enabling and supporting early digital reporting of patient results before an assay is complete, and even ordering repeat or reflex tests based on the results as they develop. The RTAMS may also serve as a digital pathology tool to support early electronic reporting of assay results and in some embodiments could replace the use of scanners used for analysis of completed assay results.

One aspect of the certain embodiments of the disclosed system and method is the ensuring of stain quality by monitoring and controlling assay outcomes.

Another aspect of the certain embodiments of the disclosed system and method is the ability to provide a faster result of stain quality in real time before the assay is complete, and permit remediation of any quality issues by alerting a user to possible quality issue, or even to automatically order a second test so that ordering such a test does not require a delay in time for a pathologist to read the test results and request the test due to quality issues evident in a finished assay.

Another aspect of certain embodiments of the disclosed system and method is the ability to optimize newly developed reagents, assays, and platforms to provide assay protocols that take less time or that can be automatically stopped when sufficiently developed, thereby shortening assay time "on-the-fly."

Other features and advantages of various embodiments of the disclosed system and method will be apparent from the following more detailed description of the identified embodiments, taken in conjunction with the accompanying drawings which show, by way of example, the principles of the disclosure.

FIG. 1 shows an embodiment of a real time assay monitoring system 10. The system 10 includes a controller 12 that can be used to control an imaging system 15 and a sample processing system 21. In one embodiment, the sample processing system 21 can use a thin-film technology with low fluid volumes, however, in other embodiments, the sample processing system 21 can use "puddle" technology wherein reagents are applied directly onto substrates, such as slides, on which a tissue or cell sample is placed. In one embodiment as shown in FIG. 1, one controller 12 can be used to control all of the components of the imaging system 15 and the sample processing system 21. However, in other embodiments, the controller 12 can include more than one controller controlling one or more components of the imaging system 15 and/or the sample processing system 21. The controller 12 (and other distributed controllers) can be connected to the imaging system 15 (which can include a camera 14, and one or more of a front light source 16 and a back light source 18) and the sample processing system 21 (which can include, for example, one or more of a fluid motion mechanism 20, a fluid exchange system 22 and a fluid dispense system 24) by a network. In one embodiment, the network connecting the controller 12 and the imaging system 15 and the sample processing system 21 can be a local area network (LAN) that uses an Ethernet protocol to communicate over the network. However, in other embodiments, the network may be the Internet, an Intranet, a wide area network (WAN), or any other type of communication network using one or more communication protocols such as the transmission control protocol/Internet protocol (TCP/IP) when using the Internet. In a further embodiment, the camera 14 can be connected to controller 12 using a GigE vision interface, but the camera 14 can, in other embodiments, be connected to the controller 12 using other types of interfaces, such as a USB vision or Camera Link interface. In still another embodiment, the controller 12 can connect with other controllers and workflow control software system solutions, for example, to a user alert system 26 or an automated test ordering system 26. The controller 12 can further connect and interface with other Internet applications and imaging applications.

Figure 2:
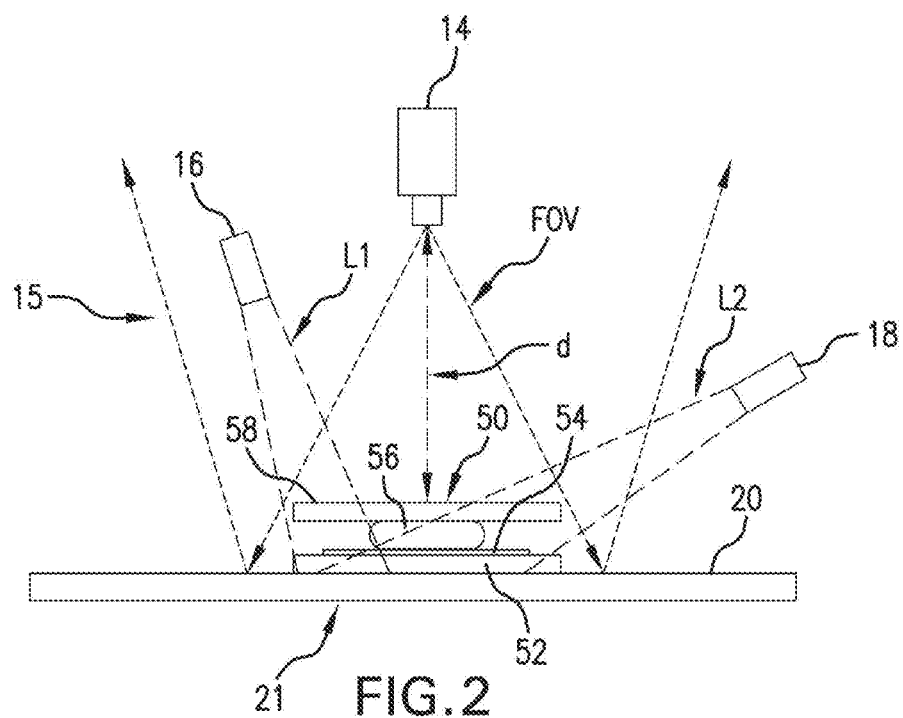
FIG. 2 shows an embodiment of an imaging system and a sample processing system for the real time assay monitoring system depicted by FIG. 1.

FIG. 2 shows a particular embodiment of an imaging system 15 and a sample processing system 21 of a real time assay monitoring system 10 of FIG. 1. The imaging system 15 can include a camera 14 and a front light source 16 and a back light source 18 as shown in FIG. 2. However, in other embodiments, the imaging system 15 can include more than one camera 14, more than one front light source 16 and more than one back light source 18. In one embodiment, some or all of the components of the imaging system 15 can be mounted on the sample processing system 21. The imaging system 15 can be used to illuminate and capture images of one or more samples in the sample processing system 21. The sample processing system 21 can include a fluid motion mechanism 20 to move fluid in the sample and a fluid exchange system 22 that has a fluid dispenser 24 (see FIG. 1, not shown in FIG. 2) to add fluid to the sample and a fluid removal device (not shown) to remove fluid from the sample, which together function as a fluid exchange system 22 (as depicted in FIG. 1). In one embodiment, the fluid motion mechanism 20 can include a roller. However, in other embodiments, the sample processing system may not include a fluid motion mechanism 20. The fluid motion mechanism 20 (schematically shown in FIG. 2) can include one or more staining cassettes (not shown) having one or more samples 50 undergoing an assay. In other embodiments, the sample processing system 21 can include more than one fluid motion mechanism 20 and more than one fluid exchange system 22. Examples of sample processing systems that can be used with the present application are described in commonly-assigned U.S. Patent Application Publication No. 2015/0323776, entitled "Specimen Processing Systems and Methods for Holding Slides" and published on Nov. 12, 2015 and commonly-assigned U.S. Pat. No. 8,883,509, entitled "Apparatus and Method for Biological Sample Processing" and granted on Nov. 11, 2014, which are incorporated herein by reference.

Each of the samples 50 held by cassettes in the sample processing system 21 can include a slide 52 holding one or more specimens 54 to be analyzed by the assay. The sample 50 shown in FIG. 2 is a schematic representation of an assay sample used to show the components in the sample and is not intended to provide any details on the relative sizes of the components. One or more fluids 56, such as reagents and/or stains, can be applied to and/or removed from the specimen 54 with the fluid exchange system 22. In one embodiment, the reagents and/or stains 56 can include, but are not limited to, antibody diluent, protease 3, reaction buffer, system fluid, HRP (horseradish peroxidase) inhibitors, antibodies, HQ linker, HRP multimers, $H_2O_2$, DAB (3,3'-Diaminobenzidine), copper reagent, Hematoxylin (HTX), probe reagent and bluing reagent. A cover 58 can then be placed over the specimen 54 and the reagent and/or stain 56. In one embodiment, the cover 58 can be a clear or translucent solid plastic or acrylic, but may have different color tints, e.g., a yellow tint, in other embodiments. In a further embodiment, the cover 58 can also be a clear fluid.

The camera 14 can be placed a predetermined distance (d) above the sample 50 such that the sample 50 is within the field of view (FOV) of the camera 14. In one embodiment, the camera 14 can be an area scan camera with global shutter to prevent the distortion of the moving object, i.e., the reagent and/or stain 56. However, other types of cameras can be used in other embodiments.

The camera 14 can be a 1600×1200 pixels (2 megapixel, 2 MP) camera with a 35 mm fixed focal length lens that has a field of view of 988×740 mm with about 61.25 μm/pixel resolution. However, in other embodiments, the camera 14 can have greater than or less than 2 megapixels, a fixed focal length lens that is greater than or less than 35 mm, a field of view that is greater than or less than 988×740 mm, and/or a resolution that is greater than or less than about 61.25 μm/pixel. In still another embodiment, the camera 14 can have a pixel scale (or resolution) of 0.16 mm or lower. In a further embodiment, the camera 14 can use a 50 mm fixed focal length lens with a smaller FOV but a higher resolution.

The predetermined distance for placement of the camera 14 above the sample 50 can be based on the resolution of the camera 14 and the number of samples 50 to be captured in the field of view of the camera 14. In one embodiment, the predetermined distance can be 19.5 inches to capture three samples 50. However, other predetermined distances can be used in other embodiments. In another embodiment, if more than three samples 50 are to be captured, a camera 14 can use a pixel array with an increased size and a lens with a decreased focal length to maintain the same image quality.

The front light source 16 and the back light source 18 can each generate white light that is used to illuminate the sample 50. In some embodiments, the front light source 16 and/or the back light source 18 can be assembled into a lamp for use with a lighting fixture. As an example, the light source may be implemented by an incandescent bulb, a light emitting diode (LED), or a fluorescent light. Yet other types of light sources and types of light are possible in other embodiments. As shown in the embodiment of FIG. 2, the front light source 16 can be positioned in the field of view of the camera 14 and direct light (L1) toward one side of the sample 50, while the back light source 18 can be positioned outside of the field of view of the camera 14 and direct light (L2) toward the opposite side of the sample 50. In other embodiments, one or both of the front light source 16 and the back light source 18 can be either within or outside of the field of view of the camera 14.

Figure 3:
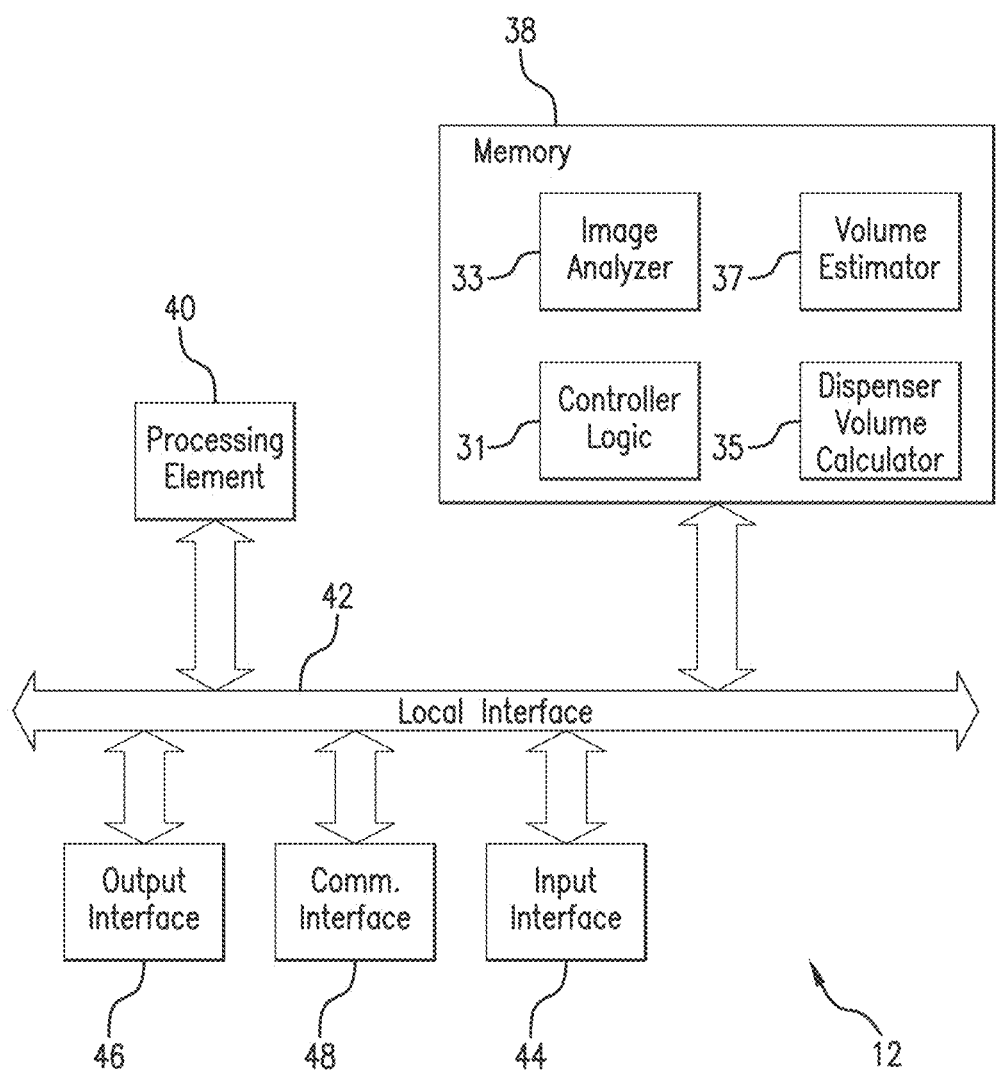
FIG. 3 schematically shows an embodiment of a controller for the real time assay monitoring system depicted by FIG. 1.

FIG. 3 shows an embodiment of the controller 12. The controller 12 can include logic 31, referred to herein as "controller logic," for generally controlling the operation of the controller 12, including communicating with the imaging system 15 and the sample processing system 21. The controller 12 also includes a volume estimator 37 to determine the amount of fluid, e.g., reagent and/or stain 56, being used with a sample 50, an image analyzer 33 to analyze the images from the imaging system 15, and a dispenser volume calculator 35 to determine how much reagent and/or stain 56 to apply to the sample 50 with the fluid exchange system 22 based on information from the volume estimator 37. The controller logic 31, the image analyzer 33, the dispenser volume calculator 35 and the volume estimator 37 can be implemented in software, hardware, firmware or any combination thereof. In the controller 12 shown in FIG. 3, the controller logic 31, the image analyzer 33, the dispenser volume calculator 35 and the volume estimator 37 are implemented in software and stored in memory 38 of the controller 12. Note that the controller logic 31, the image analyzer 33, the dispenser volume calculator 35 and the volume estimator 37, when implemented in software, can be stored and transported on any non-transitory computer-readable medium for use by or in connection with an instruction execution apparatus that can fetch and execute instructions.

The controller 12 can include at least one conventional processing element 40, which has processing hardware for executing instructions stored in memory 38. As an example, the processing element 40 may include a central processing unit (CPU) or a digital signal processor (DSP). The processing element 40 communicates to and drives the other elements within the controller 12 via a local interface 42, which can include at least one bus. Furthermore, an input interface 44, for example, a keypad, keyboard or a mouse, can be used to input data from a user of the controller 12, and an output interface 46, for example, a printer, monitor, liquid crystal display (LCD), or other display apparatus, can be used to output data to the user. Further, a communication interface 48 may be used to exchange data over one or more networks with, for example, the front light source 16, the back light source 18, the camera 14, the fluid motion mechanism 20 and the fluid exchange system 22.

The imaging system 15 can be used to obtain quality images of the sample 50 for image analysis, volume calculation, and assay sensing. In one embodiment, the camera 14 can have sufficient resolution (or distance per pixel) and contrast to capture the fluid edge and the specimen 54 in the sample 50. In other embodiments, the camera 14 can have higher resolution, i.e., a lower distance per pixel, and a lens with a smaller field of view to capture images of the sample 50 in more detail. The imaging system 15 can be used for fluid volume sensing. When sensing or measuring fluid volume, the imaging system 15 can use the front light source 16 and the back light source 18 to make the fluid boundaries bright so that the controller 12 can differentiate the fluid, e.g., reagent and/or stain 56, from the specimen 54 in the background, even when the specimen 54 has a color associated with it. In one embodiment as shown in FIG. 2, the back light source 18 can be placed outside of the field of view of camera 14 to provide dark field imaging to make the fluid boundary or edge in the sample 50 bright, so the fluid edge or boundary has strong contrast to the dark and normal background. In addition, by using dark field imaging, several other issues such as interference from shadows or a pipette blocking a light source can also be resolved. In another embodiment, the front light source 16 and the back light source 18 can be positioned about the sample 50 to provide uniform illumination of the sample 50 so that any determinations by the controller 12 using images from the imaging system 15 are not biased or skewed by lighting. In a further embodiment, bright field imaging can be used by the imaging system 15 by placing the front light source 16 in the field of view of the camera 14.

The real time assay monitoring system 10 can be used as a real time fluid adjustment system (RTFAS) to track the fluid, e.g., the reagent and/or stain, volume in the sample 50 and determine an amount of fluid to be added to or removed from the sample 50, if any, by the fluid exchange system 22. The RTFAS can use the imaging system 15, the image analyzer 33, the volume estimator 37, the dispenser volume calculator 35, the fluid exchange system 22 and a position signal from fluid motion mechanism 20. When the fluid motion mechanism 20 signals the controller 12 that it is time to take a measurement, the controller 12 would perform frame checking on the image(s) from the imaging system 15 and suggest an adjustment amount from dispenser volume calculator 35 to fluid exchange system 22, forming a feedback control loop. In another embodiment, the adjustment amount from dispenser volume calculator 35 can be provided to a user interface and a user can then control the fluid exchange system 22 to provide the reagent and/or stain 56 to the sample 50.

In one embodiment of the RTFAS, motion-based foreground detection is used to detect the boundary of clear fluid and color-thresholding foreground detection is used to detect the boundary of a stain or colored reagent, e.g., hematoxylin. The boundary detection methodologies used by the RTFAS can use a distinct feature of the fluid (target) for boundary detection and work under various conditions such as changing specimen color or the existence of random tissue patterns in the specimen 54.

Figure 4:
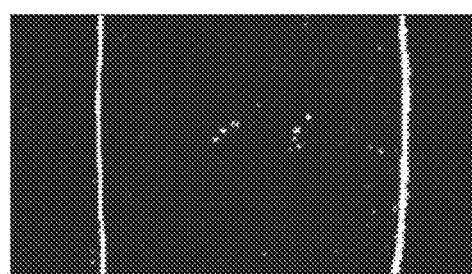
FIG. 4 shows an exemplary image used for boundary detection.

For a clear fluid, motion can be the most distinct feature because the clear fluid is the only part moving in the field of view. In one embodiment, a Gaussian mixture model foreground detection algorithm can be used by the RTFAS for boundary detection of a clear fluid. FIG. 4 shows an exemplary image generated by the Gaussian mixture model foreground detection algorithm used for boundary detection. In the Gaussian mixture model foreground detection algorithm, two boundaries of the fluid droplet (56 of FIG. 2) located on the right and left of the droplet can be extracted to calculate the fluid volume.

Figure 5:
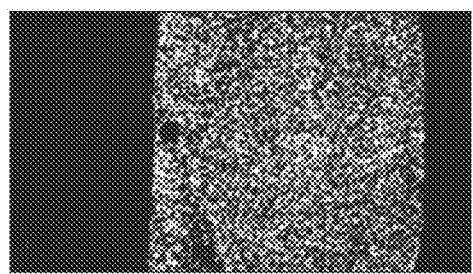
FIG. 5 shows another exemplary image used for boundary detection.

To identify the edge or boundary of a stain or colored reagent, e.g., hematoxylin, a color-thresholding foreground detection algorithm can be used because of the distinctive color feature of the fluid. The color-thresholding foreground detection algorithm can be used for boundary detection even if the specimen 54 may get a similar color to the reagent and/or stain 56 during the staining process because the intensity of the reagent and/or stain 56 is still much stronger than the specimen 54 so that the algorithm can differentiate reagent and/or stain 56 from the stained tissue of the specimen 54. The color-thresholding foreground detection algorithm can transfer the captured images from the imaging system 15 to an HSV (hue, saturation, and value) color map (see FIG. 12) for the selection of the proper hue range to extract the region of reagent and/or stain 56. FIG. 5 shows an exemplary image generated by the color-thresholding foreground detection algorithm used for boundary detection of the fluid 56 (of FIG. 2) even when the fluid 56 and tissue sample 54 (of FIG. 2) are of similar colors. Using the color-thresholding foreground detection algorithm, the area of the reagent can be extracted and the fluid volume can be calculated from the extracted area.

Referring back to FIG. 1, the controller 12 can be connected to the camera 14 to receive acquired or captured images from the camera 14. The controller 12 can also be connected to a digital I/O device associated with the fluid motion mechanism 20 to receive a digital signal indicative of the sample position of the sample 50 in the staining cassette. With the image and position signal, the RTFAS can perform image analysis, error checking, and volume calculation to suggest a proper adjustment volume. In one embodiment, the images from the camera 14 can be captured at the same sample position and then analyzed for consistent results. In another embodiment, the image analysis can be performed on either color or grayscale images.

Figure 6:
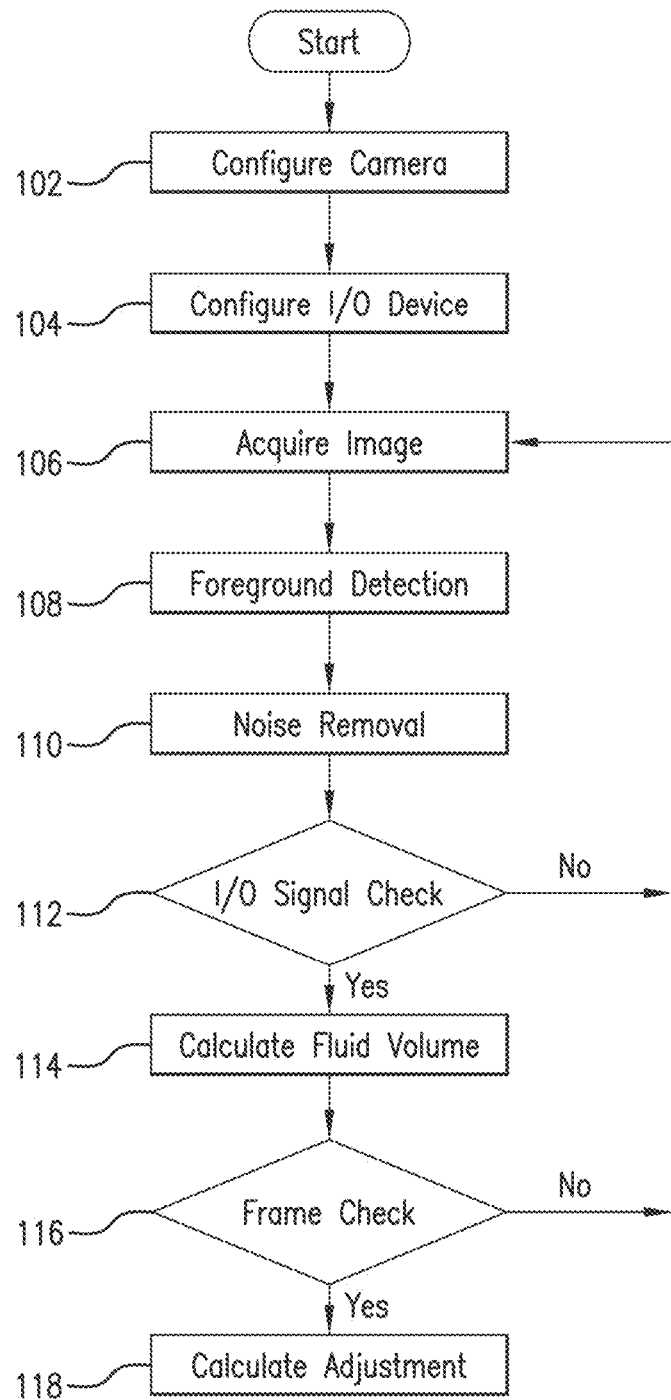
FIG. 6 shows an embodiment of a process for determining an amount of adjustment fluid for an assay.

FIG. 6 shows an embodiment of a process for determining an amount of adjustment fluid with an RTFAS. The process begins by configuring the camera 14 (step 102) by setting parameters such as exposure, brightness, and gain. The I/O device can then be configured (step 104). After the camera 14 and the I/O device have been configured, an image is acquired (step 106) from the camera 14. A foreground detection algorithm can be applied to the captured image (step 108) by the image analyzer 33 to identify fluid boundaries. In one embodiment, the image analyzer 33 can be continuously provided with images or video in order to identify the image background by machine learning. The image analyzer 33 (see, FIG. 3) can remove any noise from the processed image (step 110). An I/O signal check is then made to determine if a signal indicating the proper sample position to make a fluid measurement has been received (step 112). If the proper I/O signal has not been received, the process returns to step 106 to acquire another image.

Figure 7A:
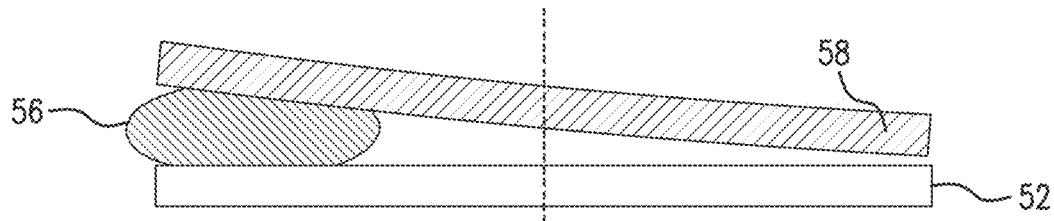
FIG. 7A shows a first position for the fluid in the system of FIG. 2.
Figure 7B:
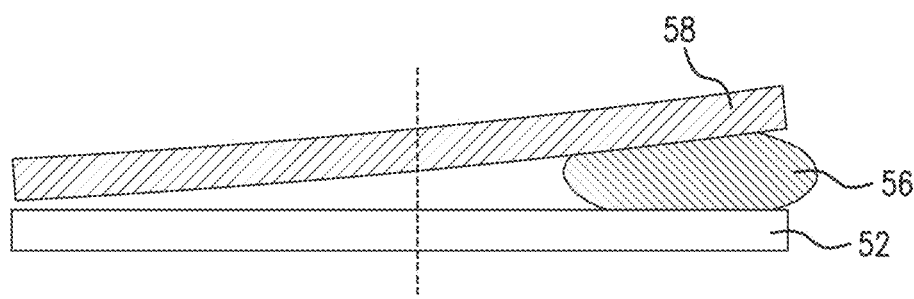
FIG. 7B shows a second position for the fluid in the system of FIG. 2.
Figure 7C:
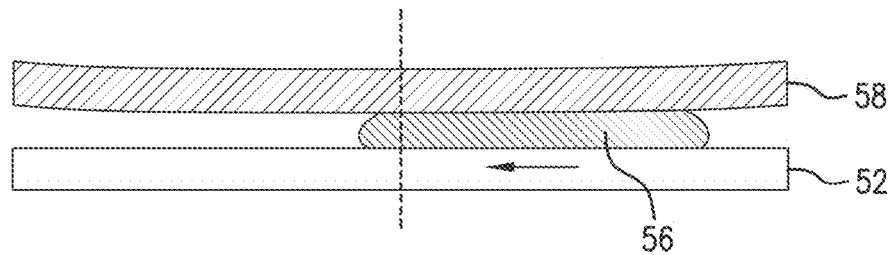
FIG. 7C shows a third position for the fluid in the system of FIG. 2.
Figure 7D:
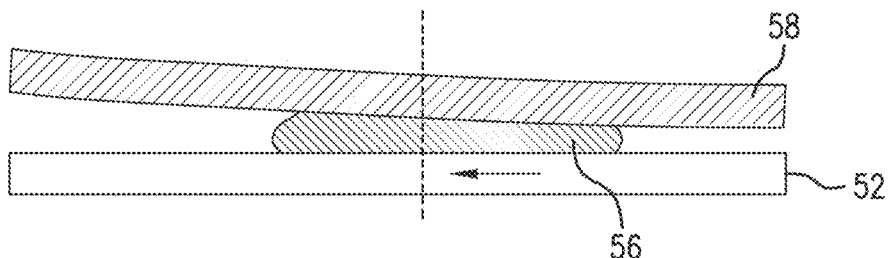
FIG. 7D shows a fourth position for the fluid in the system of FIG. 2.

The sample position, as provided by the I/O signal, can be acquired each time an image or frame is acquired in step 106 to identify the position of the reagent and/or stain 56 in the sample 50 (see FIG. 2). Sample position can be determined by the step motor positions in the fluid motion mechanism 20 (of FIG. 1) that move the staining cassette and samples 50 and thereby move the reagent and/or stain 56 in the sample 50. In one embodiment, the step motor positions and corresponding sample positions can be around +4500, which indicates one end position corresponding to the reagent and/or stain 56 at the right end of the slide 50 (see FIG. 7B), and −4500, which indicates another end position corresponding to the reagent and/or stain 56 at the left end of the slide 50 (see FIG. 7A), from a center position. The proper sample position for taking a measurement can be when the reagent and/or stain 56 is located at the center of the slide 52. FIG. 7C shows the reagent and/or stain 56 at sample position 0, which corresponds to the center position, when the reagent and/or stain 56 is moving from right to left in FIG. 7C, which sample position does not correspond to the reagent and/or stain 56 being in the center of the slide 52. Since the reagent and/or stain 56 is moving in the sample 50, the proper sample position would be at a predetermined location relative to the center of the slide (which corresponds to sample position 0) depending on the direction of travel and the viscosity of the reagent and/or stain 56. In one embodiment as shown in FIG. 7D, the reagent and/or stain 56 is at the measurement point, i.e., the reagent and/or stain 56 is in the center of the slide, at sample position −300, when the reagent and/or stain 56 is moving from right to left in the sample 50. The embodiments shown in FIGS. 7A-7D are schematic representations used to show the position of the reagent and/or stain 56 relative to sample position and are not intended to provide any details on the relative sizes of the components.

As described above, the reagent and/or stain 56 can be dragging behind the center of the sample position, so the measurement should be taken slightly away from the central point of the sample position. For example, when acquiring images at the central point of the fluid motion mechanism 20, the majority of the reagent and/or stain 56 can be on the left-hand side of the central point when the reagent and/or stain 56 is travelling to the right and the majority of the reagent and/or stain 56 can be on the right-hand side of the central point when the reagent and/or stain 56 is travelling to the left. In one embodiment, the RTFAS can be used to characterize the relationship between the motion of the reagent and/or stain 56 and fluid motion mechanism 20, to understand how reagent and/or stain 56 rolls at different rolling speed and rolling volume, and to investigate how different reagents with different viscosities behave during the rolling operation since the RTFAS can acquire images at certain sample positions.

In one embodiment, the RTFAS can check sample position periodically. A detection mechanism in the fluid motion mechanism 20, which generates the I/O signal, can determine if the sample position passes sample position −300 when moving from sample position +4500. The detection mechanism can adjust the I/O signal to a "1" if the sample position is between −300 and +4500 and adjust the I/O signal to a "0" in other positions. The RTFAS can record or store the I/O signal, and if the previous I/O signal equals to 1 and the current I/O signal changes to 0, then the RTFAS knows the reagent and/or stain 56 is moving from an sample position of +4500 and just crossed a sample position of −300, which corresponds to the reagent and/or stain 56 being in the proper position for a measurement. In another embodiment, the detection mechanism can send a signal that corresponds to the sample position and the RTFAS can evaluate the signal from the detection mechanism to determine whether the corresponding sample position from the signal is within a predetermined range of the predetermined location of the sample position. For example, the RTFAS can indicate a positive I/O signal if the sample position is between about −200 and −400 when the reagent and/or stain 56 is moving from right to left in the sample 50.

Referring back to FIG. 6, if an I/O signal is received indicating the proper sample position, then a fluid volume is calculated by the volume estimator 37 (step 114). In one embodiment, the volume of the reagent and/or stain 56 can be calculated based on the system (or "ARC") geometry and the measured fluid bandwidth or length, i.e., the distance between the detected fluid boundaries. In one embodiment, the calculated volume may have to be calibrated to account for assumptions used in the volume calculation and/or other possible matters that may affect the accuracy of the calculation. A frame check is then performed (step 116) to determine if the frame and corresponding volume calculation are acceptable. The frame check can check for errors such as an excessive volume change and check for other abnormal frame conditions such as a pipette blocking the field of view. If the frame or volume calculation is not acceptable, i.e., there is an error or abnormality associated with the frame or the volume calculation, the process returns to step 106 to acquire another image. If the frame and volume calculation are acceptable, an adjustment amount is calculated (step 118) by the dispenser volume calculator 35 and the process returns to step 106 to acquire another image.

In one embodiment, an adjustment amount should only be determined when the volume calculation is done from a satisfactory image or frame with clear fluid boundaries as can be judged by image processing analyzer 33 of FIG. 3. During the staining process, several different types of events can occur that can affect the accuracy of the volume estimation and thereby affect the calculation of the adjustment amount. For example, a frame with a pipette arm travelling through the field of view may yield an excessive calculated volume. To overcome some of the problems with accurate volume estimation, the ratio of the bright pixels in a frame is calculated as part of the frame check in step 116 to ensure that an adjustment amount is not calculated when bright pixels represents more than 50% of the frame. In other words, an acceptable frame has less than 50% of bright pixels in the frame.

In another embodiment, an accurate volume calculation cannot occur when one part of the fluid boundary is not in the field of view. For example, the fluid boundary may be out of range, i.e., not in the field of view, when the reagent and/or stain 56 has a large volume, such as 200 µL or more, and is moving at a high speed, such as more than 100 mm/s. In a further embodiment, an accurate volume calculation cannot occur when the foreground analysis of step 108 cannot provide a correct fluid boundary. In the above two embodiments, the RTFAS can compare the previous volume to the current volume. If there is a large difference between the two volumes, the RTFAS can wait until the next measurement point to determine the current volume. In other words, when there is a large difference between two calculated volumes, the frame check in step 116 can reject the volume measurement and return the process to step 106 to acquire a new image.

Figure 8:
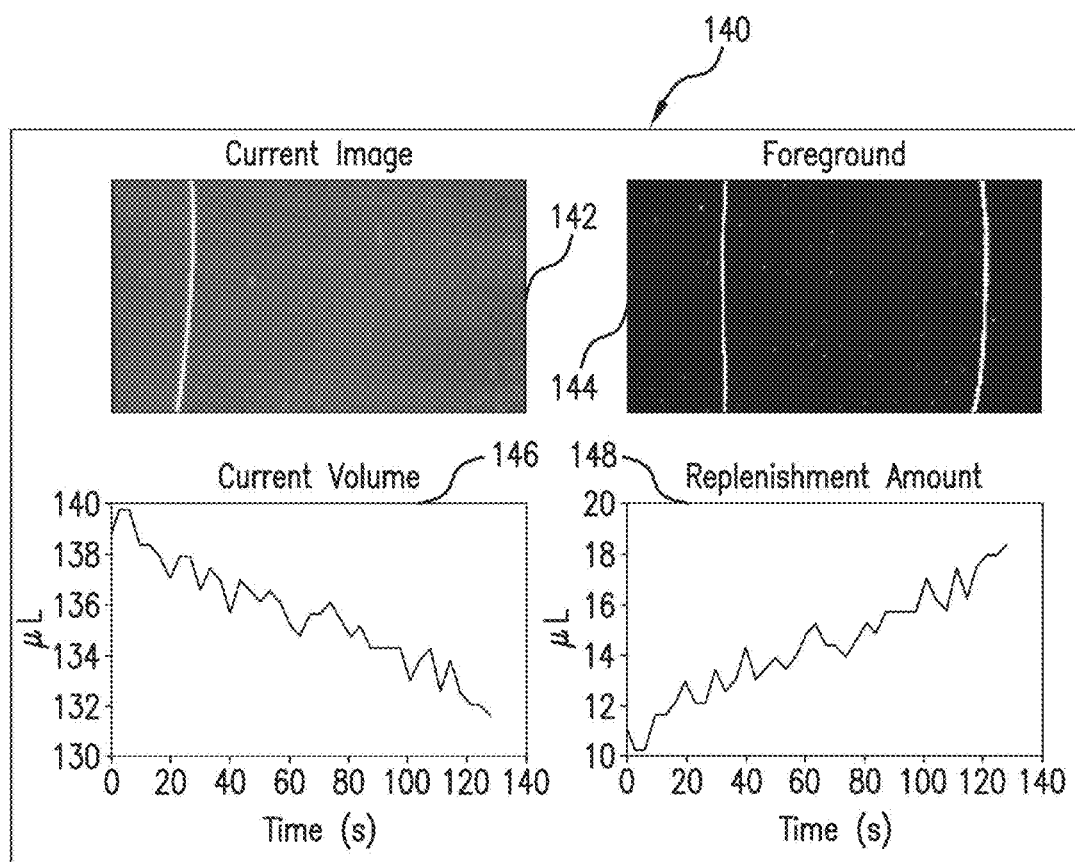
FIG. 8 shows an exemplary screenshot of a graphical user interface (GUI) displayed by a real time adjustment system, the single screenshot showing four individual displayed panels which provide information (e.g. current image, foreground, current volume, and replenishment amount) to the user based on the process illustrated in FIG. 6.

In one embodiment, the RTFAS can provide a user interface for a user to monitor the process of FIG. 6. FIG. 8 shows an exemplary screenshot of a user interface displayed by the RTFAS. The user interface 140 displayed by the RTFAS can include four panels to provide information to the user on the process of FIG. 6. A first panel 142 shows the current image acquired by camera 14. A second panel 144 shows the foreground detected using the Gaussian Mixture Model or color-thresholding method. A third panel 146 shows the calculated current volume (over time) based on the detected foreground. A fourth panel 148 shows the calculated adjustment amount (over time) based on a user-input target volume, an offset volume, and the measured volume. As shown in the third panel 146 of FIG. 8, a decline of measured volume of about 8 µL can be observed due to the evaporation of the reagent and/or stain 56 during 120 seconds of rolling.

The RTFAS can detect for the formation of bubbles in the reagent and/or stain 56 and can compensate for the presence of the bubbles in the volume calculation in step 114. If volume calculation does not compensate for the presence of bubbles, the volume calculation may be overestimated because the bubbles formed in the reagent and/or stain 56 would increase the measured fluid bandwidth. In one embodiment, bubbles may form in the reagent and/or stain 56 when antibody diluent is being used in the sample 50.

In one embodiment, the circular shape of the bubbles inside the fluid can be used to detect for the presence of the bubbles and then perform compensation for the bubbles. A circle detection scheme can be used to identify any bubbles in the detected foreground of the acquired image. By calculating the numbers of bubbles in the image and giving proper volume compensations for the bubbles, the volume of the reagent and/or stain 56 can be measured more accurately in the presence of bubbles in the reagent and/or stain 56.

In one embodiment, the RTFAS can perform image acquisition, sample position acquisition, and image analysis in about 0.06 seconds and would have a frame rate of about 16 frames per second. The processing time can be based on the programming language used to perform the image analysis and the performance of the computer used to execute the image analysis. Improvements in processing time may be obtained by using more efficient programming languages or better performing computers.

The real time assay monitoring system 10 can also be used to calculate a saturation index for an assay that corresponds to a signal intensity score given by a pathologist analyzing the results of the assay with a microscope at the completion of the assay. The calculated indices, such as the saturation index, can be obtained from changes in colors on the tissue specimen. The changes in color are captured during a reaction in which chromogen colors get deposited on the sample specimen during a reaction (e.g., during DAB deposition) and other color uptakes (e.g. dyes and fluorophores used, for example, in multiplexing assays). Thus, the system 10 can monitor and measure an index of a reaction in real time. In addition, the calculated saturation index can be used to monitor, in real time, the staining process for the samples 50. An example of a staining process that can be used with the present application are described in commonly-assigned U.S. Patent Application Publication No. 2013/0302852, entitled "Hematoxylin Staining Method" and published on Nov. 14, 2013, which is incorporated herein by reference.

Figure 9:
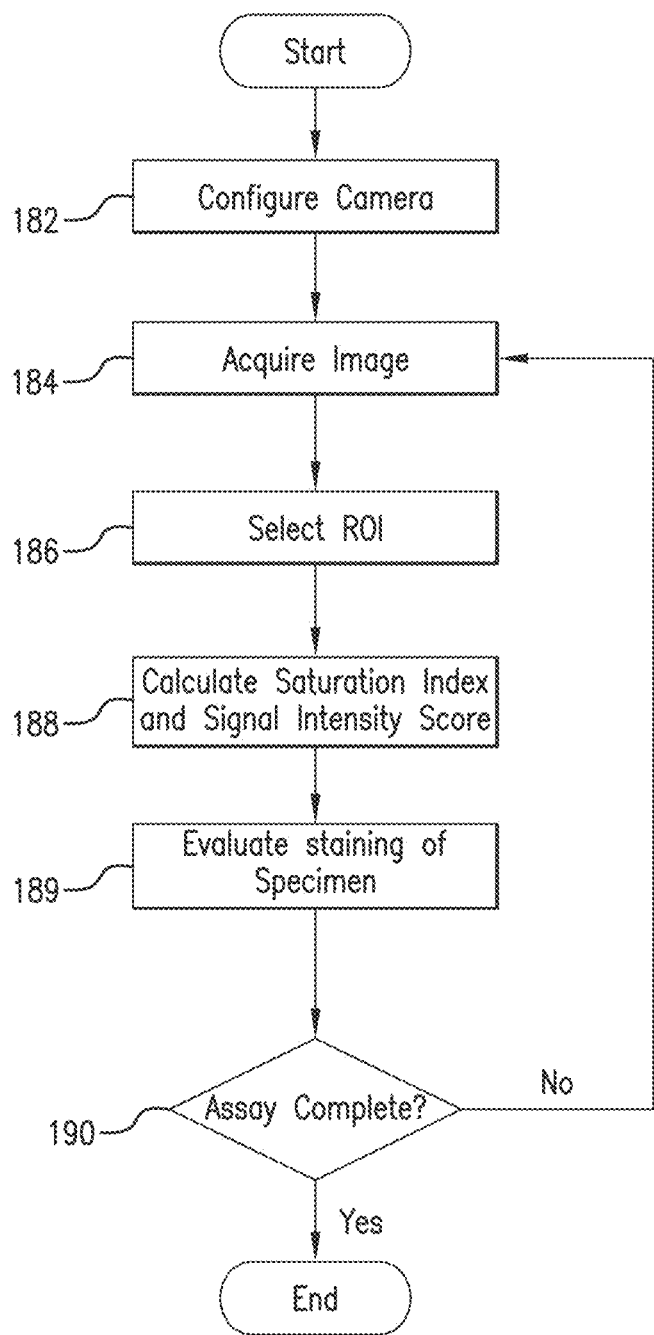
FIG. 9 shows an embodiment of a process for monitoring an assay.
Figure 10:
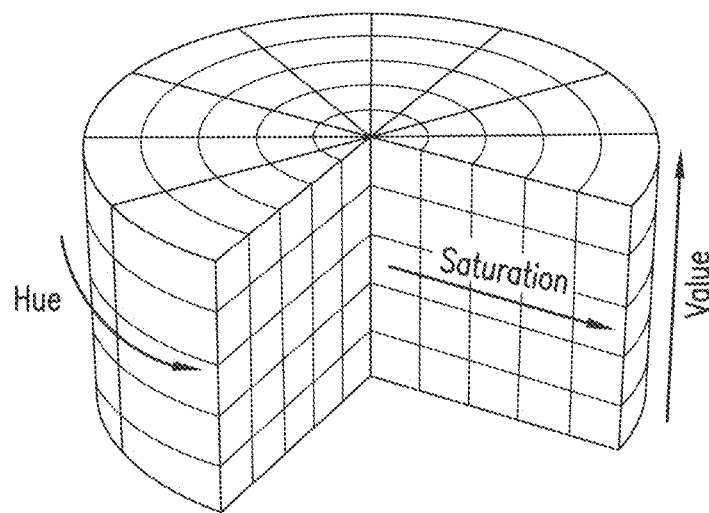
FIG. 10 shows an embodiment of an HSV color model.

FIG. 9 shows an embodiment of a process for monitoring the staining process of an assay. The process begins by configuring the camera 14 (step 182) by setting parameters such as exposure, brightness, and gain. After the camera 14 has been configured, an image is acquired (step 184) from the camera 14. Each acquired image can be composed of a matrix with values representing the color for each pixel. In one embodiment, the HSV (hue, saturation, value) color model can be used. However, in other embodiments, different color models, such as RGB (red, green, blue), L*A*B*, or YCbCr, can be used. For the HSV color model, the hue index provides information, in the form of numbers, about the color of the specimen 54, the saturation index provides information on the lightness or darkness of the staining, and the value index, sometimes called the brightness index, also provides light/dark information on the stain. FIG. 10 shows an embodiment of an HSV color model. As shown in FIG. 10, the hue index (or value) represents the color, a saturation index (or value) close to zero refers to a very light color close to white, and a value index (or value) close to zero refers to a very dark color close black. When the saturation index and the value index each reach a peak, a "pure color" is obtained.

Figures 11, 12:
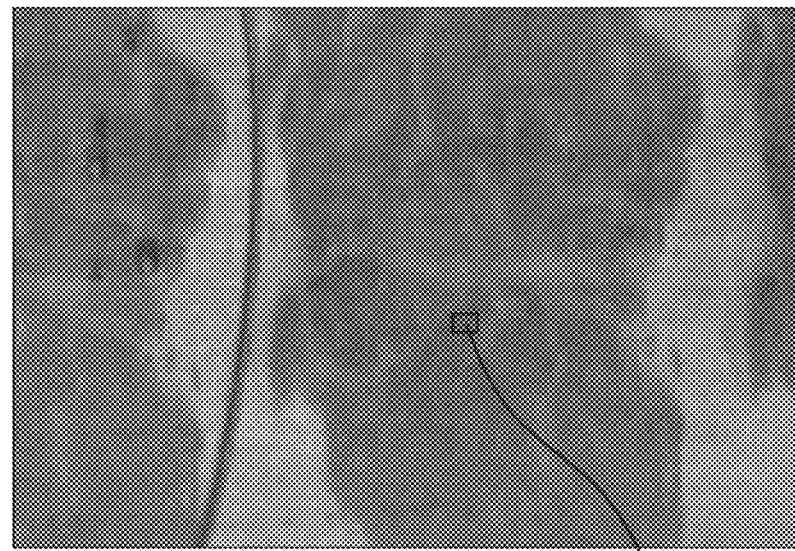
FIG. 11 shows an embodiment of a captured image with a region of interest selected.
FIG. 12 shows an embodiment of matrix values corresponding to the region of interest in FIG. 11.
Figure 13:
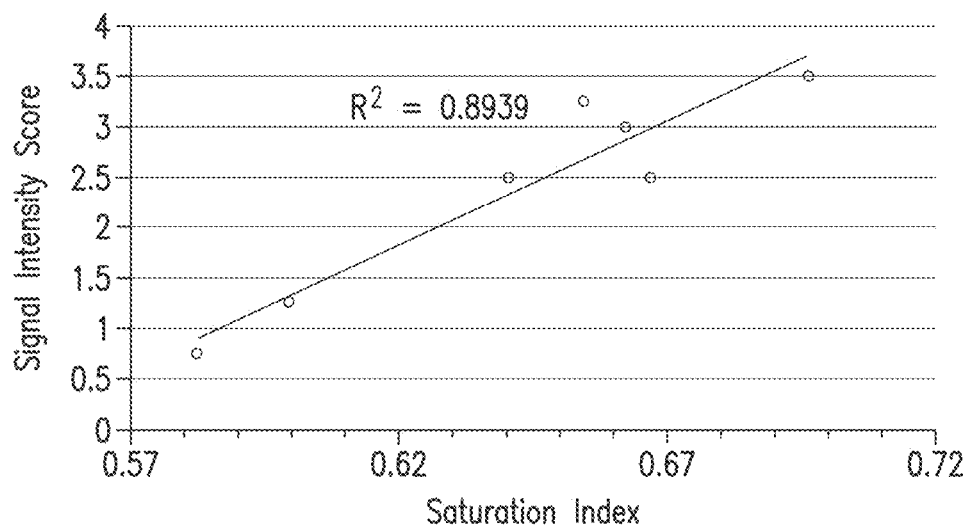
FIG. 13 shows an exemplary graph of a correlation between signal intensity scores and saturation indexes.

Referring back to the process of FIG. 9, a region of interest (ROI) can be selected (step 186) in the captured image. As shown in FIG. 11, a box 202 can be positioned to correspond to the selected for the region of interest (ROI) in the acquired image. In one embodiment, an ROI can be selected in a region of the tissue being stained either by a user or automatically by the system 10. In another embodiment, the same or a different ROI can be selected for each acquired image from one sample 50. Within the ROI, the image has a number or index representing the local intensity for each pixel as shown in FIG. 11. The array of different intensities corresponding to the pixels in the ROI can be analyzed and compared to each other. In one embodiment, the ROI can be established as the same location of a tissue biopsy that has been placed on different slides. The arrays of the ROIs from the different slides can be compared to each other, either prior to or during the assay process, to provide a baseline. Once the baseline is established, any differences between the arrays of the ROIs of processed samples and the baseline are directed to the result of the assay process. A saturation index and a signal intensity score for the selected ROI can be calculated (step 188). The calculated saturation index can be converted to a signal intensity score using a predefined correlation. FIG. 13 shows a graph of the correlation between signal intensity scores and saturation indexes. In one embodiment, the correlation between signal intensity scores and saturation indexes can be made experimentally by performing staining procedures with different antibody and DAB incubation times and recording the saturation index for each of the staining procedures just before the end of the staining procedure. The results of each of the staining procedures can then be provided to a pathologist for a signal intensity score which is then correlated to the recorded saturation index.

Figure 14:
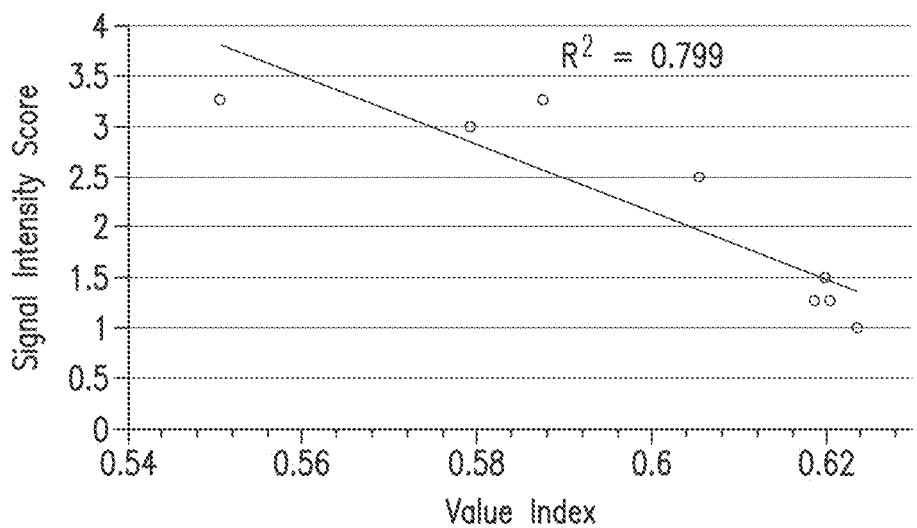
FIG. 14 shows an exemplary graph of a correlation between signal intensity scores and value indexes.

In another embodiment, the value index can be used instead of the saturation index to generate the signal intensity score. FIG. 14 shows a graph of the correlation between signal intensity scores and value indexes. In one embodiment, the correlation between signal intensity scores and value indexes can be made experimentally by performing staining procedures with different antibody and DAB incubation times and recording the value index for each of the staining procedures just before the end of the staining procedure. The results of each of the staining procedures can then be provided to a pathologist for a signal intensity score which is then correlated to the recorded value index. In still another embodiment both the saturation index and the value index can both be used to generate a corresponding signal intensity score. In a further embodiment, the hue index can be used for color detection when multiple colors are used to distinguish multiple assay targets in the same specimen through multiplexing staining procedures since similar colors are encoded close to each other in numeric values.

The calculated signal intensity score can be used to evaluate the staining of the specimen (step 189). The calculated signal intensity score can be used to determine if the staining process is proceeding as expected while the staining process is still ongoing. A determination can then be made as to whether the assay had been completed or should be stopped or modified (step 190). If the assay has been completed because the specified incubation time has elapsed or if the assay should be stopped or modified because the signal intensity score indicates a problem with the staining process, the process ends, otherwise the process returns to step 184 to acquire another image.

In one embodiment, the real time assay monitoring system 10 can be used to ensure tissue staining uniformity. The system 10 can segment the specimen areas into different ROIs and compare their saturation indexes. If there is a declining or increasing trend of saturation indexes, there can be a gradient of the staining signal intensity, which occurs in the case of a non-uniform stained sample. When performing the saturation index comparison, the saturation index value can be normalized to the slide background to ensure that saturation index differences are not obtained from differences in local lighting conditions.

Figure 15A:
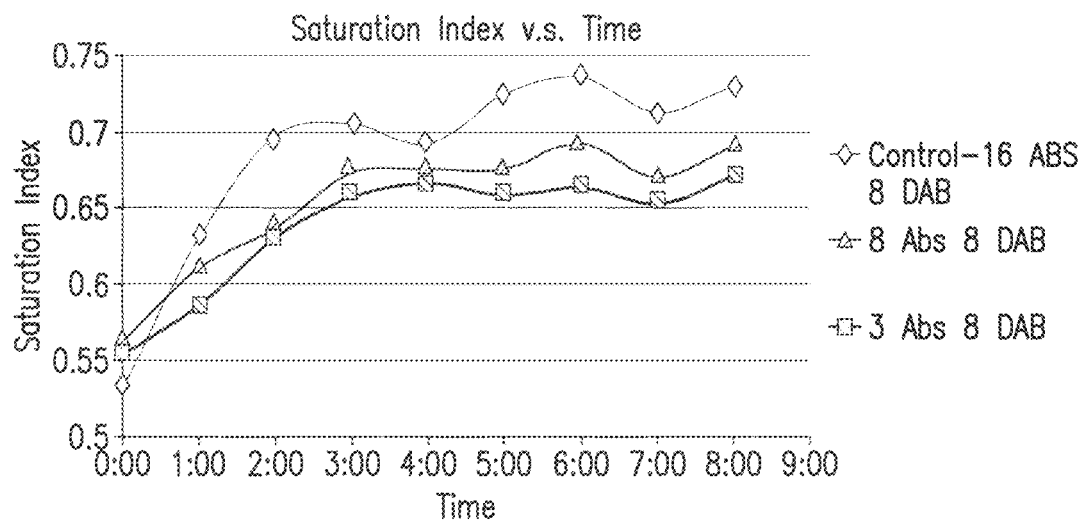
FIG. 15A shows an exemplary graph of the saturation index of a specimen over time.
Figure 15B:
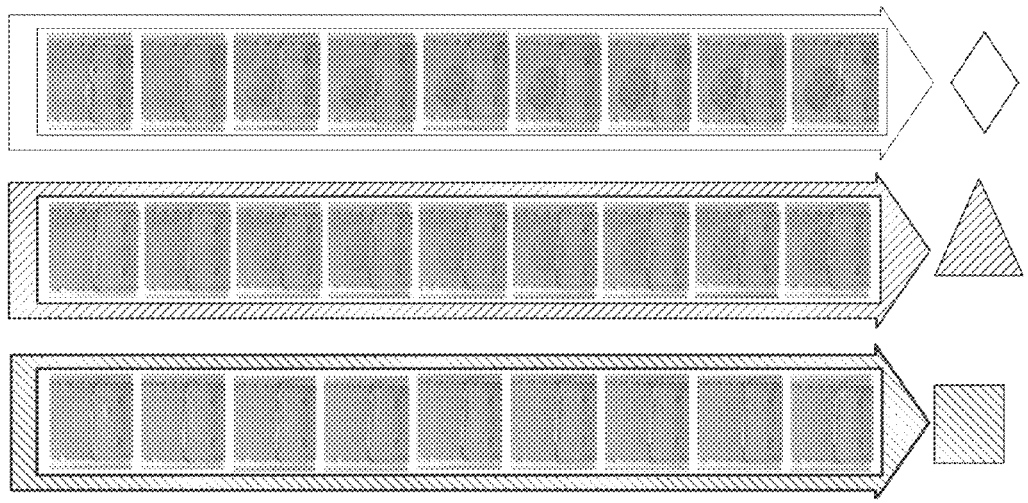
FIG. 15B illustrates a series of images captured from which a saturation index comparison may be performed.
Figure 16A:
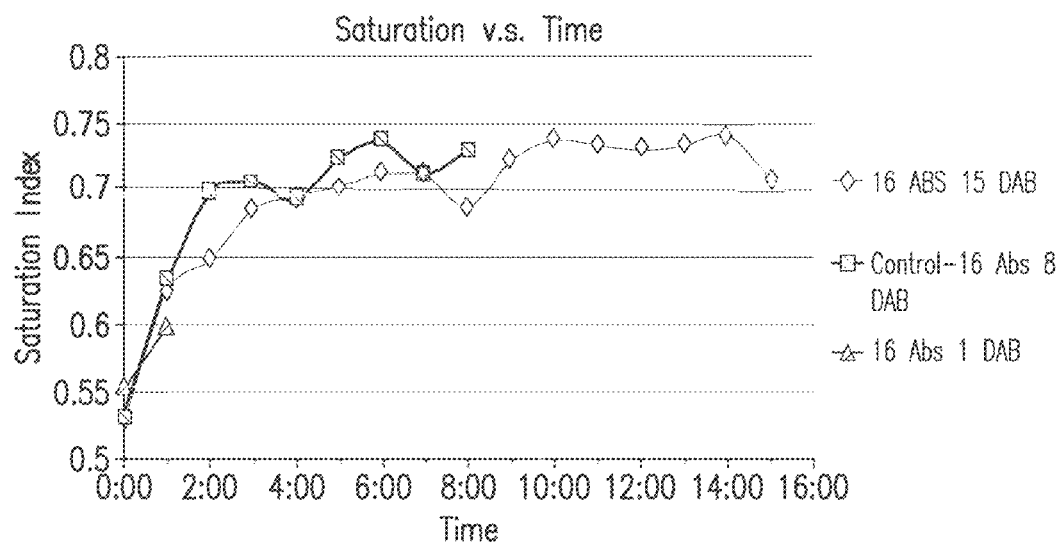
FIG. 16A shows another exemplary graph of saturation index of a specimen over time.
Figure 16B:
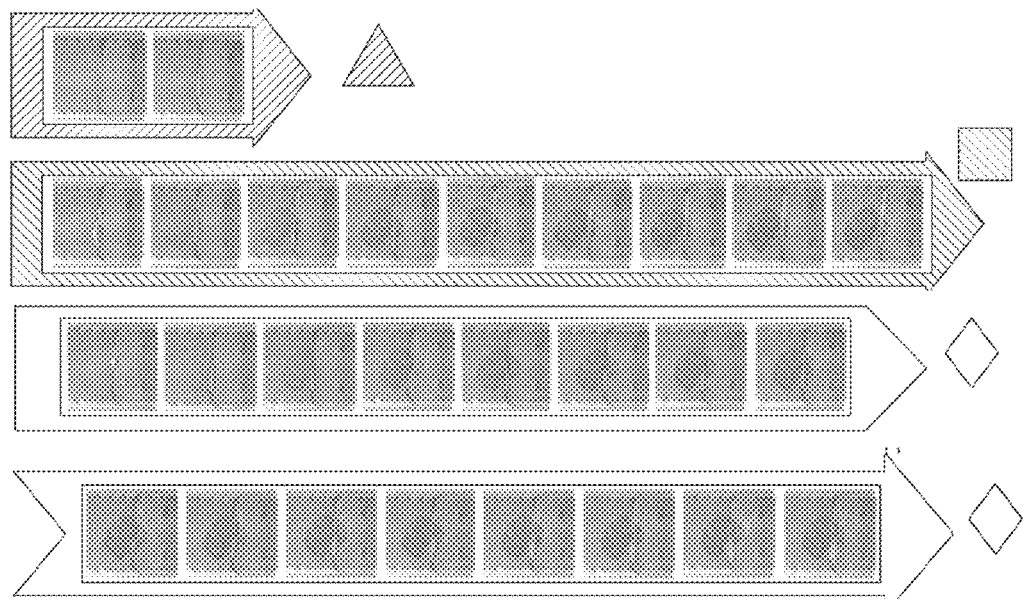
FIG. 16B illustrates a series of images captured from which a saturation index comparison may be performed.

In another embodiment, the real time assay monitoring system 10 can be used to optimize assay protocols. For example, the real time assay monitoring system 10 can monitor the saturation index in real time at about a frame per minute/or less for antibody incubation time optimization while maintaining DAB incubation time the same for each sample. As shown in FIG. 15, 16 minutes of antibody incubation time results in the saturation index being above 0.7 after 2 minutes during the DAB color reaction, which indicates that the 16 minute antibody incubation time results in the desired signal intensity for stain quality measurement optimization. If the antibody incubation time is shortened to 8 minutes, the saturation index during the DAB color reaction can only saturate around 0.68. Further, if the antibody incubation time is shortened to 3 minutes, the saturation index can only reach around 0.66. In another example, the real time assay monitoring system 10 can also monitor the saturation index in real time at about a frame per minute for $DAB/H_2O_2$ incubation time optimization while maintaining the antibody incubation time the same for each sample. As shown in FIG. 16, DAB incubation for only 1 minute shows that the saturation index just stops while the saturation index is in a sharply increasing region, as evidenced by the other samples. For 15 minutes of DAB incubation, the saturation index rises above 0.7 after 6 minutes and may indicate that the extra minutes of DAB incubation time are not necessary. Finally, a DAB incubation time of 6-8 minutes may provide better results because the signal is allowed to saturate with the time and there is also a time margin about 2-4 minutes to ensure the signal saturation. The difference in the saturation index from the different assay protocols shows that the real time assay monitoring system 10 can be used to optimize assay protocols, such as antibody incubation time and/or DAB incubation time.

In one embodiment, the system 10 can discern and measure changes in color during an assay chromogen reaction. The system 10 can discern the presence or absence of color, determine the type of color and distinguish intensity and brightness. By measuring the changes in color during the assay chromogen reaction, the system 10 can be used for assay and platform development and extended to quality control monitoring and workflow monitoring.

In another embodiment, the system 10 can be equipped to provide a scoring assessment of the stain quality in real time. The stain quality scores provide insight of the assay performance and staining results before the assay is complete. As the system 10 calculates the results obtained from a digital image, preliminary scores can be stored and/or reported electronically for various purposes. The preliminary scores may aid pathologists and technicians by providing an assessment of the stain quality, initial results of the assay, and preliminary diagnostic assessment of the test case. Thus, the system 10 can be used as a digital pathology tool enabling and supporting early digital reporting of patient results to pathologists before assay procedure is complete. Moreover, data collected throughout the assay procedure can also be stored as part of the slide's barcode as part of a workflow solution. The system 10 can be used to maintain record keeping of the assay workflow accessible on cloud based workflow software outside of the staining platform.

In a further embodiment, the system 10 can be used as an assay and reagent development tool. As a development tool, the system 10 can measure and profile measurement parameters linked to color change based on experimental testing for chromogens, reagents and antibody development. The measured results can help determine the optimal reagent, antibody, chromogen and counterstain incubation times based on pathologist scoring criteria. The measured results provided by the system 10 enables determining which experimental conditions of antibody, chromogen detection and counterstain reagents incubations are sufficient and necessary in real time for optimal assay performance in the development and validation of the assays. The system 10 can be applied to both fluorescent and non-fluorescent chromogens contingent on having filters that permit visual inspection at appropriate wavelengths. Moreover, because the system 10 permits color separation, the system 10 can separate multiple different fluorophores and bright field chromogen colors at the same time during multiplexing IHC (immunohistochemistry). Thus multiplexing characterization of staining and validation can be enabled and readily optimized by quantitative parameters obtained with the system 10. Moreover, the system 10 can be used to implement any experimental manipulation including assessment of bulk reagents and test their impact on stain quality with the scoring algorithm.

In still another embodiment, the scoring algorithm used by the system 10 also enables quality monitoring and evaluation of platform performance. For example, implementation of real time assay monitoring could permit assessment of staining quality linking the potential platform design changes or platform related testing to the potential impact on stain quality for both primary and advanced staining platforms.

In an additional embodiment, the system 10 can be used with marketed platforms to monitor consistency in desired stain quality in situations where global customers have varying preferences in stain intensity and hue. Thus, the system 10 can enable customers to program stain preference and hue based on a quantitative scale such as through a touch screen. The quantitative scale could serve as a metric for real time monitoring, and evaluating stain preference in a quality controlled approach. The monitoring system 10 can provide an unbiased quantitative parameter to distinguish those settings that could be validated by pathologists.

Figure 17:
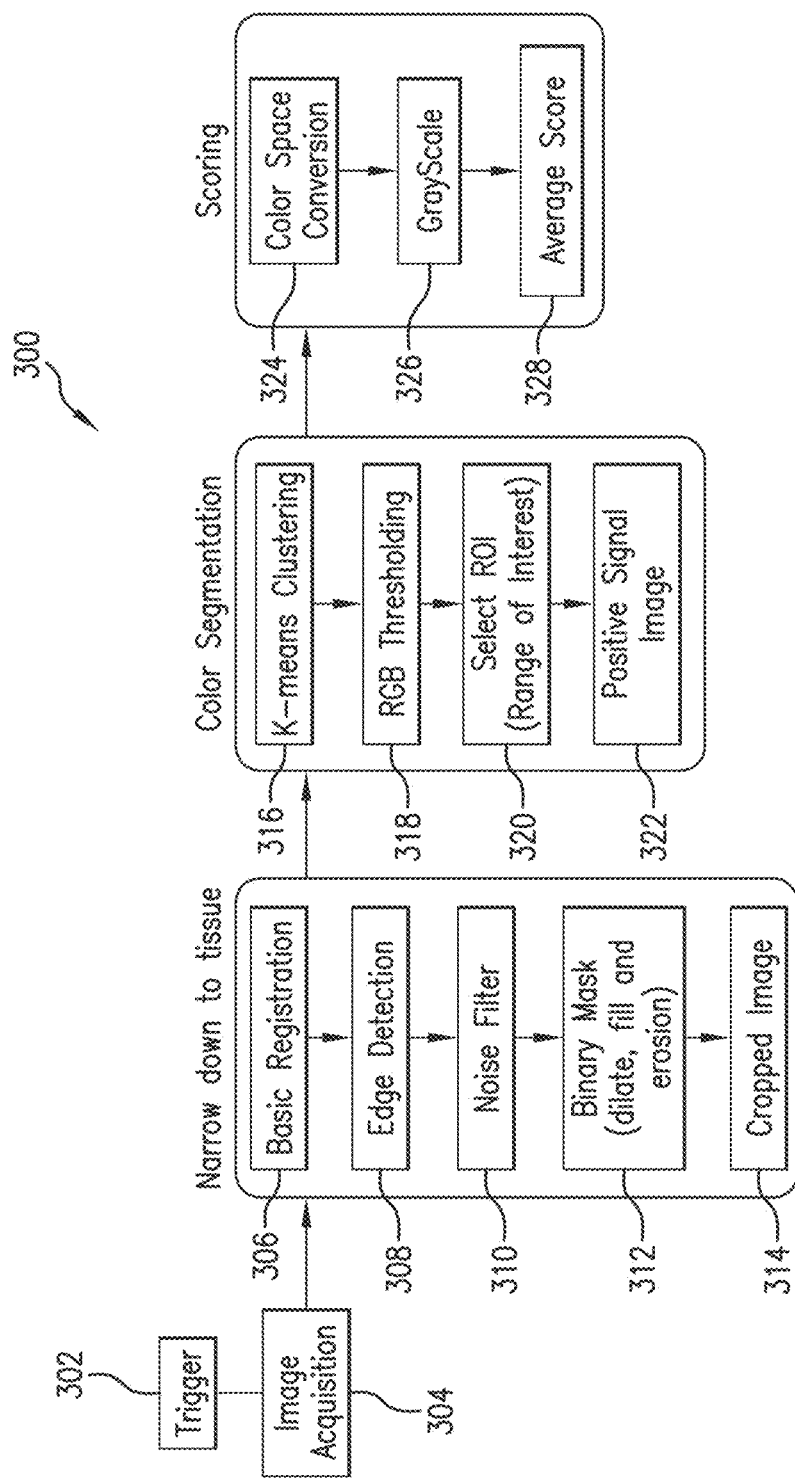
FIG. 17 shows an embodiment of an image analysis process for monitoring staining in a system.
Figures 18A, 18B:
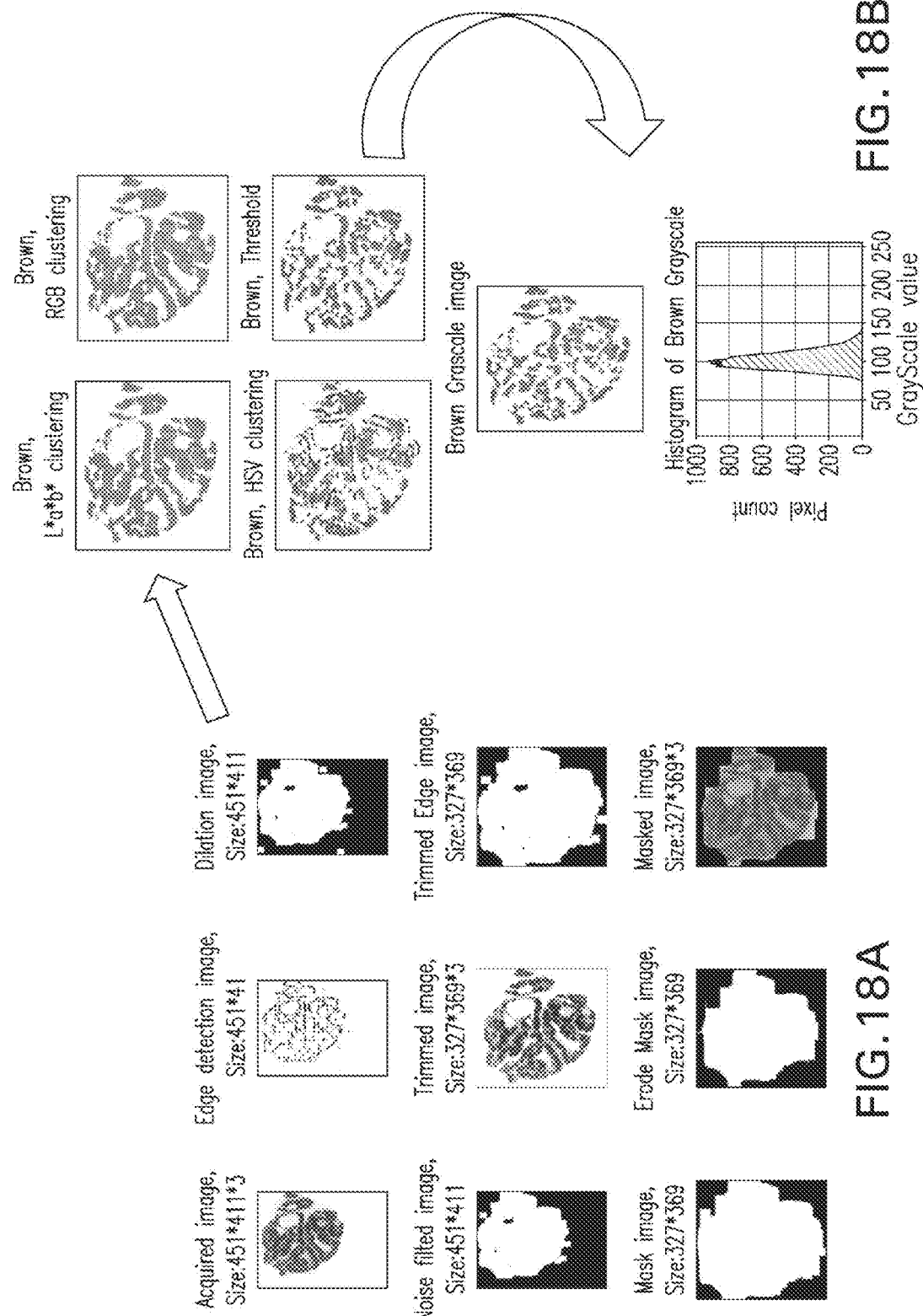
FIG. 18A shows an example of the results for several different schemes of color space conversion followed by conversion to grayscale. Specifically.
FIG. 18B shows an example of the results for several different schemes of color space conversion followed by conversion to grayscale. Specifically, FIG. 18B visually demonstrates the processes of color segmentation and scoring as described in FIG. 17, but further illustrating several embodiments of color space conversions that are possible alternatives.

Turning now to FIG. 17, and embodiment of a process 300 for image analysis of DAB signal intensity is shown, which process can be used for monitoring stain process progression (for example, for quality control or assay development) that could trigger a user alert or for providing early results of an assay (such as a threshold % positivity of cells having a particular biomarker) that could trigger the automatic ordering of a reflex test to investigate for a correlated biomarker that could aid in a patient diagnosis. Once the controller of the system triggers 302 image acquisition 304, the image analysis system then identifies the tissue through a process of basic registration 306, edge detection 308, filtering of noise 310, formation of a binary mask 312 (a process that can include dilation, filling and image erosion as is shown in FIG. 18), and production of a cropped image 314. The cropped image 314 is then further analyzed to segment that different colors in the images by, for example, K-means clustering 316, RGB thresholding 318, selection of an ROI 320 and generation of a positive signal image 322. The positive signal image 322 is then scored in this embodiment by first making a color space conversion 324, conversion to grayscale 326, and generation of an average score 328.

Panel A of FIG. 18 shows images visually illustrating the process of tissue identification as described with regard to the process of FIG. 17. Panel B of FIG. 18 visually demonstrates the processes of color segmentation and scoring as described in FIG. 17, but further illustrating several embodiments of color space conversions that are possible alternatives.

FIG. 19 illustrates additional types of average grayscale and saturation scores that can be generated according to additional embodiments of the disclosed system and method and that can be used to assess stain process progression and quality.

The correlation between pathologists' signal intensity score was investigated when the staining system was a "puddle" system as opposed to the thin film staining system of FIG. 2. Two indices were considered for the scoring approach for signal intensity score of stained tissues in RTAMS: one was a grayscale intensity converted from RGB color space, and the other was the saturation index in HSV color space, which was used successfully in the thin-film staining environment.

Grayscale images contain multiple shades of gray in between black and white. Grayscale index was chosen because each pixel only carries intensity information after colorimetric conversion from RGB color space or another color space. 8-bit grayscale index format converted from RGB color space was applied. This index varies from black as absolute absence of intensity (0 out of 255) to white as absolute presence of intensity (255 out of 255), and thus is inversely proportional to an intensity score provided by pathologist, since a darker signal will receive higher intensity score from pathologists but a lower index value from grayscale. As described and shown in FIGS. 17 and 18, edge detection was used to create a binary mask that separated the section containing tissue from the entire acquired image including some image dilation and erosion. Next, color segmentation was used to separate the stains by colors, which are positive signals, counterstain signal and background. Different color segmentation strategies had been tested but k-means clustering for setting thresholds in RGB color space works well for the CD20 assay in the puddle environment.

In order to demonstrate the utility of grayscale and saturation as RTAMS scores for monitoring assay progression in the puddle environment, the correlation of both indices to pathologists' intensity score was established. Various incubation times of CD20 antibody and Hematoxylin were chosen to create different intensity levels of positive signal and counterstain signal on tonsil tissues following a standard DAB detection protocol (UltraView DAB, Ventana Medical Systems, Inc., Tucson, AZ, USA) as shown in Table 1 below. Two slides were stained under each set of experimental condition. The assay process images were captured by the RTAM system at 0.5 fps starting at the moment the DAB detection reagents were dispensed onto the slides.

TABLE 1

| Reagents | Time (minutes) | | | | | | | |
|---|---|---|---|---|---|---|---|---|
| DAB | 8 | 8 | 8 | 8 | 8 | 8 | 8 | 4 |
| CD-20 Antibody | 16 | 12 | 8 | 4 | 16 | 16 | 16 | 4 |
| Hematoxylin | 4 Control | 4 | 4 | 4 | 16 | 12 | 8 | 4 |

As mentioned above, a saturation index was utilized for the thin film staining environment of FIG. 2, and in comparison with pathologists' intensity scoring had reached a correlation of $R^2=0.89$ (see, FIG. 13).

Figure 20:
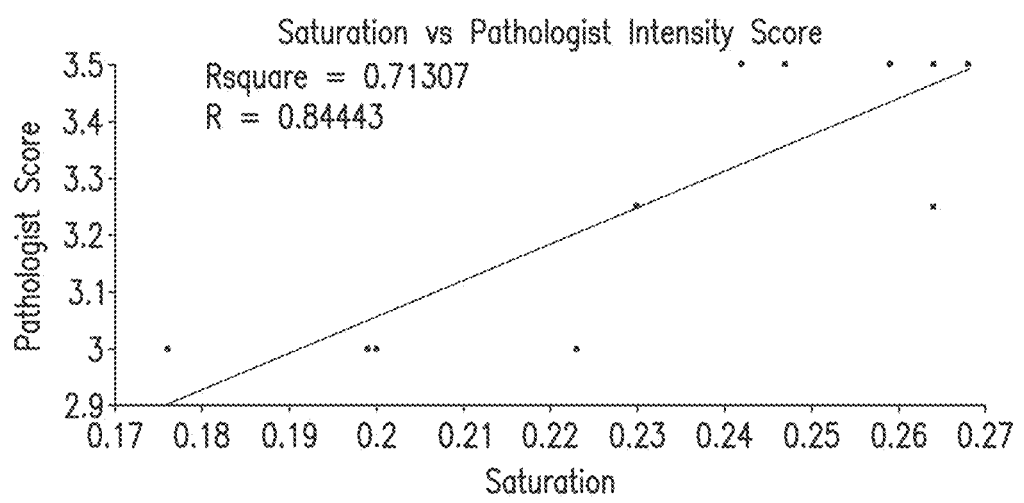
FIG. 20 shows a comparison of results obtained using a disclosed automated real-time method for stain intensity scoring based on saturation with intensity scoring through visual pathological scoring
Figure 21:
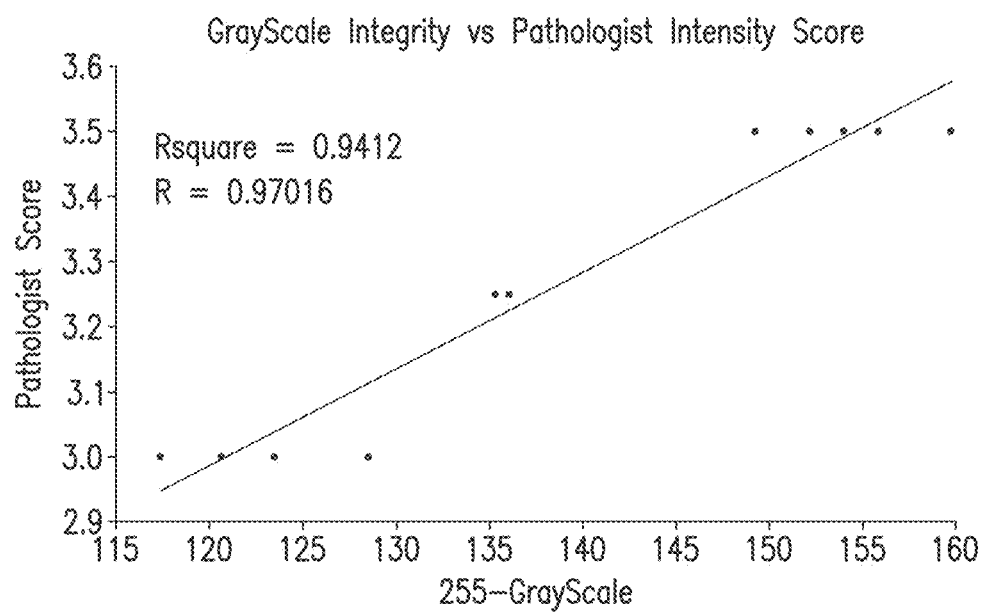
FIG. 21 shows a comparison results obtained using a disclosed automated real-time method for stain intensity scoring based on color space conversion and grayscale conversion with intensity scoring through visual pathological scoring

FIG. 20 shows the correlation between pathologists' scores and the saturation value in the puddle environment. The $R^2$ value is lower than what was seen in the thin film environment. In contrast, as shown in FIG. 21, generation of the 8-bit grayscale index proved to reach outstanding correlation ($R^2=0.94$) with intensity score given by pathologists and thus demonstrated the feasibility of monitoring CD20 assay in real time by a computer provided by the RTAMS to monitor the assay staining process of CD20 assay. Furthermore, these tests demonstrated that the system can provide interpretive results before the assay ends, since RTAMS calculates the scores at the moment before hematoxylin is dispensed onto the tissue samples, whereas the pathologists' scores were made after the slides had undergone the complete assay protocol.

Figure 22:
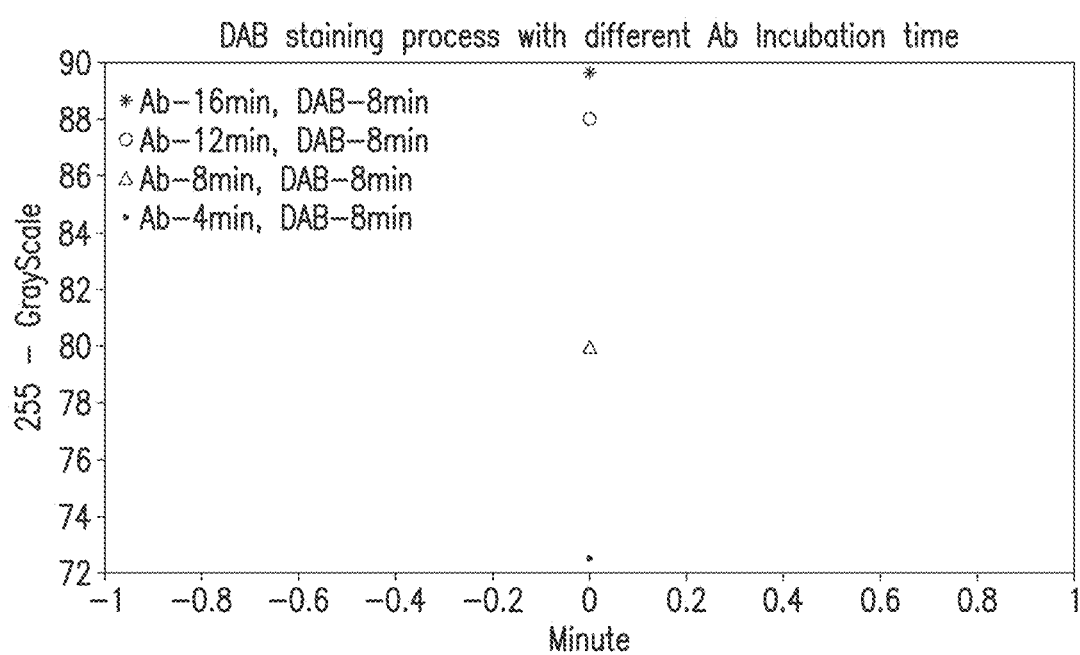
FIG. 22 shows a disclosed grayscale intensity index vs. antibody incubation time.

Further evidence that RTAMS can monitor assay development in real time was obtained by an experiment wherein only the antibody incubation time was varied, but the DAB detection time was kept constant. The experimental conditions for this test are shown below in Table 2, and the results are shown in FIG. 22, which clearly demonstrates a correlation between the RTAMS grayscale score and the antibody incubation time.

TABLE 2

| Reagents | Incubation Time (minutes) | | | |
| --- | --- | --- | --- | --- |
| DAB | 8 | 8 | 8 | 8 |
| CD-20 Antibody | 16 | 12 | 8 | 4 |

Figure 23A:
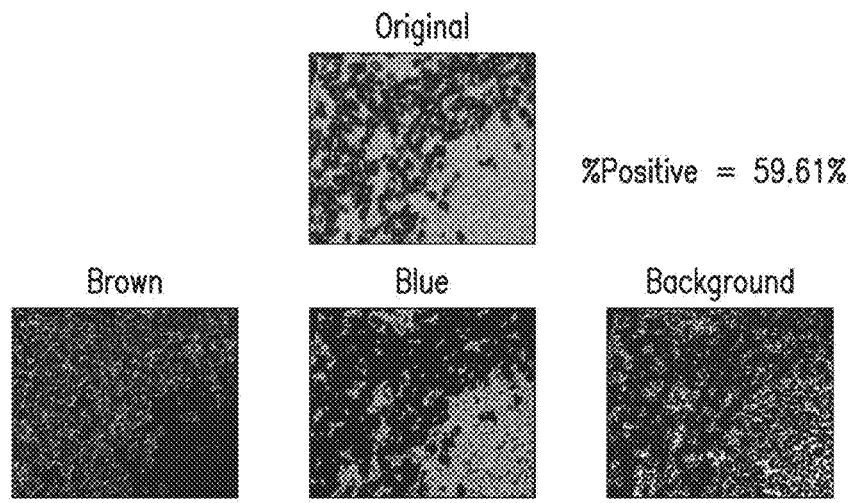
FIGS. 23A and 23B show a disclosed automated method for real-time calculation of percent positive cells for a CD20 IHC assay.
Figure 23B:
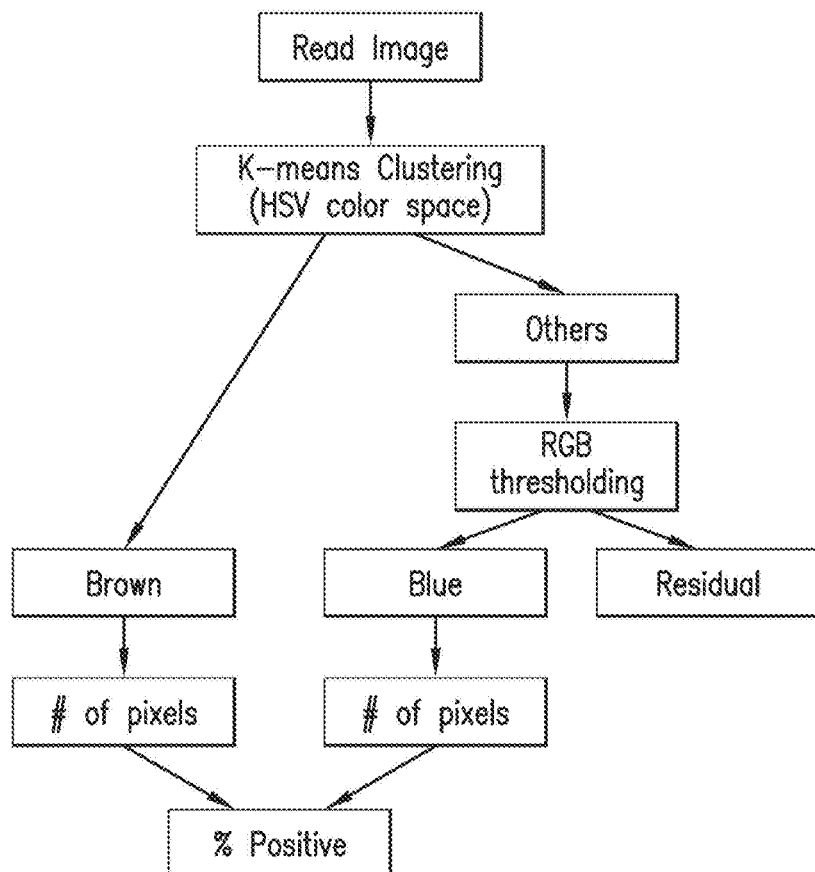

RTAMS can also be used to calculate a percentage of positive cells of in the CD20 according to the embodiment of FIG. 23. In the CD20 assay, three colors are evident in the images: brown for the DAB signal, light blue for the counterstaining signal and a white background, as is shown in Panel A of FIG. 23. As illustrated in Panel B of FIG. 23, K-means clustering in HSV color space can be used to separate brown with other colors. And then, threshold setting in RGB color space is used to divide blue from white background. This particular example calculates an index based on pixels instead of cells, wherein the % positive cells is calculated by dividing the number of brown pixels by the sum of brown and blue pixels and multiplying by 100. A possible alternative to this method is to utilize machine learning method to build a classifier to separate stained cell and non-stained cells and arrive at a percent % cells. Since such measures of % positive cells can be obtained during the assay, it is possible to provide a logic module as part of the automated test ordering system 28 of FIG. 1, wherein if for a given test a predetermined number of cells in a sample are positive for a particular marker, a second (and possibly third, fourth or more) test is automatically ordered before the first test is finished. Alternatively, a test result (for example, a result upon which a particular therapy decision could be made) could be output from controller 12 immediately upon the number of positive cells reaching a predetermined value.

Figure 24A:
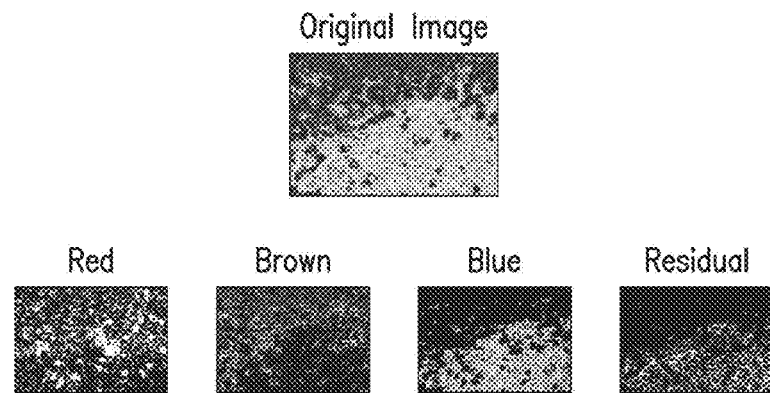
FIGS. 24A and 24B show a disclosed automated method for real-time separation of different stain colors in a multiplexed assay.
Figure 24B:
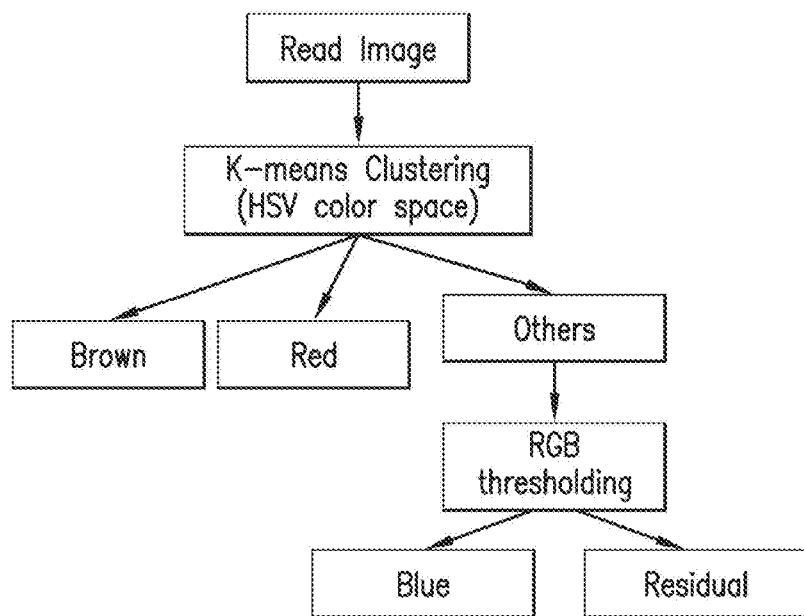

Another embodiment of the disclosed real time assay system and method includes a system and method for separating the portion of a sample image that is stained by DAB (brown) and a Red chromogen. Setting a threshold in RGB channel is no longer a proper method for color detection since both brown and red contain main intensity in the R channel for a DAB/Red assay. Therefore, k-means clustering in various color spaces including RGB, HSV and L*a*b* was tested. As a result, k-means clustering in RGB color space was found to be the optimal solution for color detection in DAB/Red assay. The overall scheme of this embodiment is shown in FIG. 24.

The strategy, however, could be altered other combinations of thresholding, segmenting, clustering and color spaces as needed for other assays having different colors. Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

As used herein, the singular terms "a," "an," and "the" include plural referents unless the context clearly indicates otherwise. Similarly, the word "or" is intended to include "and" unless the context clearly indicates otherwise.

The terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary unless a particular order is clearly indicated by the context.

The invention claimed is:

1. An assay monitoring system, comprising:
   a sample processing system comprising at least one specimen undergoing an assay, wherein the at least one specimen is disposed on a substrate;
   an imaging system comprising a camera, wherein the imaging system is positioned adjacent to the sample processing system, the imaging system configured to capture an image of the at least one specimen during the assay; and
   a controller communicatively coupled to the imaging system to receive the captured image of the at least one specimen from the imaging system, wherein the controller is configured to process the captured image to (i) derive a saturation index based on the processed image; (ii) determine at least one attribute associated with the assay based on the processed image, and (iii) control the sample processing system in response to the determined at least one attribute, wherein the at least one determined attribute comprises a signal intensity score for the at least one specimen, and wherein the derived saturated index is converted to the signal intensity score using a predetermined correlation derived from experimental data.

2. The system of claim 1, wherein the signal intensity score for the at least one specimen is obtained from a grayscale value derived from the processed image.

3. The system of claim 1, wherein the imaging system comprises:
at least one light source positioned to illuminate the at least one specimen; and
wherein the camera is positioned a predetermined distance from the at least one specimen such that the at least one specimen is within a field of view of the camera.

4. The system of claim 3, wherein the at least one light source is positioned outside of the field of view of the camera to provide dark field imaging to the at least one specimen.

5. The system of claim 1, wherein:
the sample processing system comprises a fluid motion mechanism configured to move fluid across the at least one specimen during the assay and a device configured to determine a position of the fluid motion mechanism; and
the controller is communicatively coupled to the sample processing system to receive the determined position from the sample processing system.

6. The system of claim 5, wherein the controller is configured to process the received image from the imaging system in response to the received position from the sample processing system being within a predetermined position range.

7. The system of claim 1, wherein the imaging system is configured to repeatedly capture an image of the at least one specimen at a predetermined interval during the assay.

8. A computer implemented method of monitoring a specimen undergoing an assay, the method comprising:
capturing an image of a specimen undergoing an assay with an imaging system comprising a camera, wherein the specimen is disposed on a substrate;
selecting a region of the captured image, the region including at least a portion of the specimen undergoing the assay;
calculating a saturation index value for the selected region of the captured image;
converting the calculated saturation index value to a signal intensity score using a predetermined correlation based on experimental data; and
evaluating the specimen undergoing the assay using the signal intensity score; and
controlling the assay in real-time based on the evaluation of the specimen.

9. The method of claim 8, further comprising repeating at a predetermined interval during the assay said capturing the image, said selecting the region, said calculating the index value, said converting the calculated index value and said evaluating the specimen.

10. The method of claim 9, wherein said selecting a region includes selecting the region at a substantially similar location for each predetermined interval.

11. The method of claim 8, wherein:
said selecting the region includes selecting a plurality of regions of the captured image;

said calculating the index value includes calculating a respective index value for each region of the plurality of regions;
the method further comprises comparing the calculated index values for each region of the plurality of regions; and
determining a non-uniform specimen undergoing the assay in response to the comparison of the calculated index values indicating differences in the calculated index values.

12. The method of claim 8, wherein said evaluating the specimen includes evaluating a staining process of the specimen using the signal intensity score.

13. An assay monitoring system, comprising:
a sample processing system comprising at least one sample having at least one specimen undergoing an assay;
an imaging system comprising a camera positioned adjacent the sample processing system, the imaging system configured to capture an image of the at least one sample during the assay; and
a controller communicatively coupled to the imaging system to receive the captured image of the at least one sample from the imaging system, wherein the controller is configured to process the captured image to determine at least one attribute associated with the assay based on the processed image and to control the sample processing system in response to the determined at least one attribute.

14. The assay of claim 13, wherein the at least one determined attribute includes one or more of an amount of fluid in the at least one sample or a signal intensity score for the specimen.

15. The system of claim 14, wherein the signal intensity score for the specimen is obtained from a saturation index derived from the processed image.

16. The system of claim 14, wherein the signal intensity score for the specimen is obtained from a grayscale value derived from the processed image.

17. The system of claim 13, wherein the imaging system is configured to repeatedly capture an image of the at least one sample at a predetermined interval during the assay.

18. The system of claim 13, wherein the imaging system comprises:
at least one light source positioned to illuminate the at least one sample; and
a camera positioned a predetermined distance from the at least one sample such that the at least one sample is within a field of view of the camera, wherein the at least one light source is positioned outside of the field of view of the camera to provide dark field imaging to the at least one sample.

19. The system of claim 13, wherein:
the sample processing system comprises a fluid motion mechanism configured to move fluid in the at least one sample during the assay and a device configured to determine a position of the fluid motion mechanism; and
the controller is communicatively coupled to the sample processing system to receive the determined position from the sample processing system.

20. The system of claim 19, wherein the controller is configured to process the received image from the imaging system in response to the received position from the sample processing system being within a predetermined position range.

* * * * *